(12) United States Patent
Wu et al.

(10) Patent No.: US 9,698,684 B2
(45) Date of Patent: Jul. 4, 2017

(54) ADAPTIVE SOFT SWITCHING CONTROL FOR POWER CONVERTER

(75) Inventors: Di Wu, Kingston (CA); Konrad Woronowicz, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 162 days.

(21) Appl. No.: 14/424,346

(22) PCT Filed: Aug. 27, 2012

(86) PCT No.: PCT/CA2012/000797
§ 371 (c)(1),
(2), (4) Date: Jul. 24, 2015

(87) PCT Pub. No.: WO2014/032156
PCT Pub. Date: Mar. 6, 2014

(65) Prior Publication Data
US 2015/0318784 A1    Nov. 5, 2015

(51) Int. Cl.
*H02M 3/156*    (2006.01)
*H02M 3/158*    (2006.01)
(Continued)

(52) U.S. Cl.
CPC ........... *H02M 3/157* (2013.01); *H02M 3/158* (2013.01); *H02J 7/34* (2013.01); *H02M 3/1584* (2013.01);
(Continued)

(58) Field of Classification Search
CPC .... H02M 3/156; H02M 3/1584; H02M 3/158; H02M 3/157; H02M 2001/0009;
(Continued)

(56) References Cited

U.S. PATENT DOCUMENTS 5,932,938 A * 8/1999 Shimamori ........... H02M 3/157
307/125
8,184,456 B1 * 5/2012 Jain ........................ H02M 5/29
363/21.02
(Continued)

FOREIGN PATENT DOCUMENTS

CN    101291110 A    10/2008
CN    101425751 A    5/2009
(Continued)

OTHER PUBLICATIONS

Canadian Examiner's Report issued on Jan. 28, 2016 for Canadian Patent Application No. 2879543 (6 pages).
(Continued)

*Primary Examiner* — Adolf Berhane
*Assistant Examiner* — Sisay G Tiku
(74) *Attorney, Agent, or Firm* — The Webb Law Firm

(57) ABSTRACT

A control apparatus for use in controlling a power converter adapted to carry out power conversion between a high-voltage end and a low-voltage end includes an input configured for receiving at least one input signal conveying a sensed voltage across the high-voltage end, a sensed voltage across the low-voltage end and a sensed current through the low-voltage end; circuitry configured for determining a target switching frequency, a target dead time and a target duty cycle for the converter based at least in part on the sensed voltages, the sensed current and at least one circuit characteristic of the converter; and an output configured for releasing at least one output signal to cause the converter to carry out soft switching in accordance with the target switching frequency, the target dead time and the target duty cycle.

19 Claims, 19 Drawing Sheets

(51) Int. Cl.
*H02M 3/157* (2006.01)
*H02M 1/00* (2006.01)
*H02J 7/34* (2006.01)

(52) U.S. Cl.
CPC ...... *H02M 2001/0058* (2013.01); *Y02B 40/90* (2013.01); *Y02B 70/1491* (2013.01)

(58) Field of Classification Search
CPC ............. H02M 3/1588; H02M 3/1582; H02M 3/1586; H02M 2001/0058; H02M 1/38
See application file for complete search history.

(56) References Cited

U.S. PATENT DOCUMENTS

| | | | | |
|---|---|---|---|---|
| 2006/0132102 A1* | 6/2006 | Harvey | ............... | G05F 1/67 320/166 |
| 2007/0103092 A1* | 5/2007 | Millner | ............... | H01J 37/321 315/276 |
| 2007/0108040 A1* | 5/2007 | Elkin | ............... | C01B 13/115 204/176 |
| 2008/0084714 A1* | 4/2008 | Kawasaki | ............... | H02M 3/33576 363/21.01 |
| 2011/0019440 A1* | 1/2011 | Shimada | ............... | H02M 3/33584 363/17 |
| 2011/0085355 A1 | 4/2011 | Adragna | | |
| 2011/0261589 A1* | 10/2011 | Goto | ............... | H02M 3/33592 363/15 |
| 2011/0310646 A1* | 12/2011 | Humphrey | ............... | H02M 3/1584 363/126 |
| 2011/0317452 A1 | 12/2011 | Anguelov et al. | | |
| 2012/0032658 A1* | 2/2012 | Casey | ............... | H02M 3/1582 323/271 |
| 2012/0087153 A1* | 4/2012 | Bostrom | ............... | H02M 1/38 363/15 |
| 2012/0163039 A1 | 6/2012 | Halberstadt | | |
| 2012/0195074 A1 | 8/2012 | Lehn | | |
| 2013/0322126 A1* | 12/2013 | Pan | ............... | H02M 1/34 363/17 |
| 2014/0176049 A1* | 6/2014 | Yamada | ............... | H02J 7/025 320/107 |

FOREIGN PATENT DOCUMENTS

| | | |
|---|---|---|
| CN | 101436826 A | 5/2009 |
| CN | 102044972 A | 5/2011 |
| WO | 2011100827 A1 | 8/2011 |

OTHER PUBLICATIONS

Canadian Examiner's Report issued on Sep. 29, 2016 for Canadian Patent Application No. 2879543 (3 pages).

English language translation of Chinese Office Action issued on Oct. 19, 2016 in Chinese Patent Application No. 201280076558.7 (9 pages).

* cited by examiner

Current Regulator with Duty Offset Function

ADAPTIVE SOFT SWITCHING CONTROL FOR POWER CONVERTER

CROSS-REFERENCE TO RELATED APPLICATION

This application is the United States national phase of International Application No. PCT/CA2012/000797 filed Aug. 27, 2012, the disclosure of which is hereby incorporated in its entirety by reference.

FIELD OF THE INVENTION

The present invention relates generally to power converters and, in particular, to adaptive soft switching control for power converters, including voltage converters.

BACKGROUND

Medium- and high-power power converters, such as DC-DC voltage converters, have a variety of applications, including in the railway, automotive, telecommunication and aeronautical industries. For example, in electric railway applications, a wayside/onboard energy storage system may be used to supply power during train departures and absorb excess power produced through regenerative braking. The energy storage system includes a voltage converter disposed between the traction line of the railway and a storage element (e.g., an ultra-capacitor bank). In the telecommunication industry, the network infrastructure may rely at least in part of on batteries to maintain service continuity in the event of voltage surges, sags or brownouts, which calls for the use of voltage converters. In the utility industry, critical equipment and installations are protected against momentary power losses by an arrangement of batteries and voltage converters. In hybrid vehicles, a bi-directional voltage converter is disposed between a car battery and an ultra-capacitor bank in order to charge the battery during regular operation, while replenishing the ultra-capacitor bank during regenerative braking periods.

A voltage converter typically has two sides, one for a lower voltage and one for a higher voltage, and converts between the two. A voltage converter that converts a high voltage input to a low voltage output is said to operate in buck mode, while a converter that converts a low voltage input to a high voltage output is said to operate in boost mode. In some cases, the converter may be bi-directional, meaning that the converter operates in buck mode when the current flows in one direction, while at times of reverse current flow it operates in boost mode.

Typically, a voltage converter utilizes switching elements that are turned on and off in accordance with a specific switching pattern so as to produce a desired output voltage level, which can be at the high- or low-voltage side, depending on whether the converter is operating in boost or buck mode, respectively. The switching pattern is characterized by a duty cycle and a switching frequency, among possibly other parameters.

A conventional switching pattern may produce "hard switching" of the switching elements, which refers to the fact that a switching element is turned off while there is a high current flowing through it or is turned on while there is a high voltage across it. This leads to significant power loss and severe heat dissipation, which requires the converter to be dimensioned and constructed accordingly. Also, switching under such conditions may damage the switching elements. The net result is a bulky system with limited efficiency, high cost and reduced lifespan.

Thus, there is a need in the industry for an improved way in which to control the switching pattern of switching elements in a voltage converter.

SUMMARY OF THE INVENTION

Broad aspects of the present invention seek to provide an adaptive soft-switching control scheme that can be applied to non-isolated bidirectional DC-DC converters, such as single- or multi-phase half-bridge converter topologies. This control scheme seeks to achieve high conversion efficiency and low heat dissipation to converter switches and other passive components, with reliable and robust control performance over dynamically wide power and voltage range.

Accordingly, a first broad aspect seeks to provide a control apparatus for use in controlling a power converter adapted to carry out power conversion between a high-voltage end and a low-voltage end, the control apparatus comprising: an input configured for receiving at least one input signal conveying a sensed voltage across the high-voltage end, a sensed voltage across the low-voltage end and a sensed current through the low-voltage end; circuitry configured for determining a target switching frequency, a target dead time and a target duty cycle for the converter based at least in part on the sensed voltages, the sensed current and at least one circuit characteristic of the converter; and an output configured for releasing at least one output signal to cause the converter to carry out soft switching in accordance with the target switching frequency, the target dead time and the target duty cycle.

A second broad aspect seeks to provide a method for controlling a power converter adapted to carry out power conversion between a high-voltage end and a low-voltage end, the method comprising: determining a voltage across the high-voltage end, a voltage across the low-voltage end and a current through the low-voltage end; determining a target switching frequency, a target dead time and a target duty cycle for the converter based at least in part on the voltage across the high-voltage end, the voltage across the low-voltage end, the current through the low-voltage end and at least one circuit characteristic of the converter; and releasing at least one output signal for causing the converter to carry out soft switching in accordance with the target switching frequency, the target dead time and the target duty cycle.

A third broad aspect seeks to provide a computer-readable storage medium storing computer-readable instructions which, when executed by a controller, cause the controller to execute a method of controlling a power converter adapted to carry out power conversion between a high-voltage end and a low-voltage end, the method comprising: determining a voltage across the high-voltage end, a voltage across the low-voltage end and a current through the low-voltage end; determining a target switching frequency, a target dead time and a target duty cycle for the converter based at least in part on the voltage across the high-voltage end, the voltage across the low-voltage end, the current through the low-voltage end and at least one circuit characteristic of the converter; and releasing at least one output signal for causing the converter to carry out soft switching in accordance with the target switching frequency, the target dead time and the target duty cycle.

A fourth broad aspect seeks to provide a power conversion system, comprising: a converter for carrying out power conversion between a high-voltage end a low-voltage end, the converter having switching elements that are switchable on and off at controllable times to provide a controllable duty cycle, a controllable dead time and a controllable switching frequency for the converter; and a controller comprising control circuitry for controlling the times at which to switch the switching elements of the converter so as to achieve a target duty cycle, a target dead time and a target switching frequency, wherein at least one of the target duty cycle, the target dead time and the target switching frequency are time-varying in response to changes in voltage across and/or current through at least one of the high-voltage end and the low-voltage end.

A fifth broad aspect seeks to provide a power conversion system, comprising: a converter for carrying out power conversion between a high-voltage end and a low-voltage end, the converter comprising: a first switching sub-circuit with a first terminal and a second terminal, the first terminal of the first switching sub-circuit connected to a first terminal of the high-voltage end, the first switching sub-circuit comprising a first controllable switching element; a second switching sub-circuit with a first terminal and a second terminal, the first terminal of the second switching sub-circuit connected to the second terminal of the first switching sub-circuit, the second terminal of the second switching sub-circuit connected to a second terminal of the high-voltage end, the second switching sub-circuit comprising a second controllable switching element; an inductor with a first terminal and a second terminal, the first terminal of the inductor connected to the second terminal of the first switching sub-circuit and to the first terminal of the second switching sub-circuit, the second terminal of the inductor connected to a first terminal of the low-voltage end; wherein a second terminal of the low-voltage end is connected to the second terminal of the second switching sub-circuit and to the second terminal of the high-voltage end; a controller configured for implementing a method that comprises: determining a voltage across the high-voltage end, a voltage across the low-voltage end and a current through the low-voltage end; determining a target switching frequency, a target dead time and a target duty cycle for the converter based at least in part on the voltage across the high-voltage end, the voltage across the low-voltage end, the current through the low-voltage end and at least one circuit characteristic of the converter; causing the first switching element to switch from an off state to an on state and back to the off state in accordance with said target switching frequency and said target duty cycle; causing the second switching element to switch from an off state to an on state and back to the off state while the first switching element is in the off state, wherein after the second switching element switches back to the off state, the first and second switching elements each remain in the off state for the duration of the target dead time before the first switching element is switched back to the on state.

A sixth broad aspect seeks to provide a power converter for carrying out power conversion between a high-voltage end and a low-voltage end, comprising: a first switching sub-circuit with a first terminal and a second terminal, the first terminal of the first switching sub-circuit connected to a first terminal of the high-voltage end, the first switching sub-circuit comprising a first switching element with a first freewheeling diode, a first snubber capacitor and a first control input for controlling switching of the first switching element; a second switching sub-circuit with a first terminal and a second terminal, the first terminal of the second switching sub-circuit connected to the second terminal of the first switching sub-circuit, the second terminal of the second switching sub-circuit connected to a second terminal of the high-voltage end, the second switching sub-circuit comprising a second switching element with a second freewheeling diode, a second snubber capacitor and a second control input for controlling switching of the second switching element; an inductor with a first terminal and a second terminal, the first terminal of the inductor connected to the second terminal of the first switching sub-circuit and to the first terminal of the second switching sub-circuit, the second terminal of the inductor connected to a first terminal of the low-voltage end; wherein a second terminal of the low-voltage end is connected to the second terminal of the second switching sub-circuit and to the second terminal of the high-voltage end; wherein the first control input receives a first control signal that defines a switching cycle during which the first switching element is caused to switch from an off state to an on state and back to the off state, wherein at least one of (i) the period of the switching cycle and (ii) the proportion of the switching cycle during which the first switching element is in the on state is time varying, whereby upon the first switching element switching to the off state, the first snubber capacitor becomes charged and current flowing through the inductor in a direction of average current flow begins to decrease; wherein the second control input receives a second control signal that causes the second switching element to switch from an off state into an on state and back to the off state, while the first switching element remains in the off state throughout; wherein the second switching element is kept in the on state, while the first switching element remains in the off state, for at least enough time for current flowing through the inductor in the direction of average current flow to decrease to zero and then for current to begin flowing through the inductor in a direction opposite to the direction of average current flow; and wherein after the second switching element is caused to switch to the off state, the time during which both the first and second switching elements remain in the off state allows the first snubber capacitor to be at least partly discharged before the first switching element is switched back to the on state.

A seventh broad aspect seeks to provide a method of controlling a converter adapted to carry out voltage conversion between a high-voltage end and a low-voltage end, the converter comprising a first switching sub-circuit with a first terminal and a second terminal, the first terminal of the first switching sub-circuit connected to a first terminal of the high-voltage end, the first switching sub-circuit comprising a first switching element with a first freewheeling diode, a first snubber capacitor and a first control input for controlling switching of the first switching element; a second switching sub-circuit with a first terminal and a second terminal, the first terminal of the second switching sub-circuit connected to the second terminal of the first switching sub-circuit, the second terminal of the second switching sub-circuit connected to a second terminal of the high-voltage end, the second switching sub-circuit comprising a second switching element with a second freewheeling diode, a second snubber capacitor and a second control input for controlling switching of the second switching element; an inductor with a first terminal and a second terminal, the first terminal of the inductor connected to the second terminal of the first switching sub-circuit and to the first terminal of the second switching sub-circuit, the second terminal of the inductor connected to a first terminal of the low-voltage end; wherein a second terminal of the low-voltage end is connected to the second terminal of the second switching sub-circuit and to the second terminal of the high-voltage end, the method comprising: providing a first control signal to the first control input, the first control signal defining a switching cycle during which the first switching element is caused to switch from an off state to an on state and back to the off state, wherein at least one of (i) the period of the switching cycle and (ii) the proportion of the switching cycle during which the first switching element is in the on state is time varying, whereby upon the first switching element switching to the off state, the first snubber capacitor becomes charged and current flowing through the inductor in the direction of average current flow decreases; providing a second control signal to the second control input, the second control signal causing the second switching element to switch from an off state into an on state and back to the off state while the first switching element remains in the off state; wherein the second switching element is kept in the on state, while the first switching element remains in the off state, for at least enough time to cause the current flowing through the inductor in the direction of average current flow to decrease to zero and then for current to begin flowing through the inductor in a direction opposite to the direction of average current flow; and wherein after the second switching element is caused to switch to the off state, the time during which both the first and second switching elements are in the off state allows the first snubber capacitor to be at least partly discharged before the first switching element is switched back to the on state.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
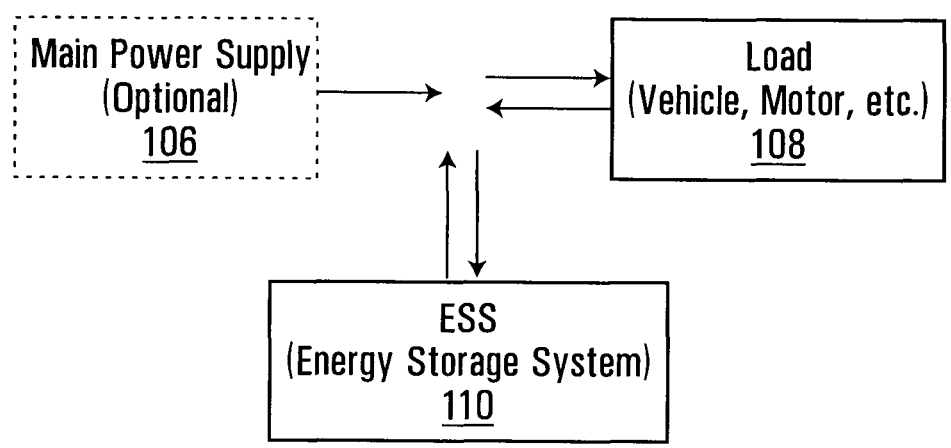
FIG. 1 is a block diagram of an electrical configuration employing an energy storage system, in accordance with a non-limiting example embodiment of the present invention.

With reference to FIG. 1, there is shown an electrical configuration comprising a load 108 and an energy storage system (ESS) 110. The electrical configuration could represent an electric rail transit system, an electric car, an industrial plant or any other application where, at times, power flows from the ESS 110 to the load 108 and, at other times, power flows in the reverse direction, from the load 108 to the ESS 110. Optionally, additional power can be supplied to the load 108 by a main power supply 106.

The ESS 110 can be an onboard system or a wayside system. For example, in an onboard system (e.g., in an electric car for use on roads and highways), the ESS 110 and the load 108 can be part of the same moving vehicle, whereas in a wayside system (e.g., in a mass rail transit system), the load 108 moves relative to the ESS 110. It should be appreciated that multiple ESS' 110 can be interconnected so as to deliver power to multiple loads 108 and/or to receive power from multiple loads 108.

In the non-limiting example case where the load 108 is embodied as the electric motor of a transportation vehicle, power can be made to flow from the load 108 to the ESS 110 if the vehicle has the ability to convert braking energy into electrical energy. Specifically, when the vehicle is braking, the electric motor is reconfigured to recover the mechanical energy produced by the vehicle's inertia (kinetic energy) and to work as a generator producing electricity. While a certain portion of this kinetic energy can be reused to power the vehicle's auxiliaries, the remaining energy is captured by the ESS 110.

Figure 2:
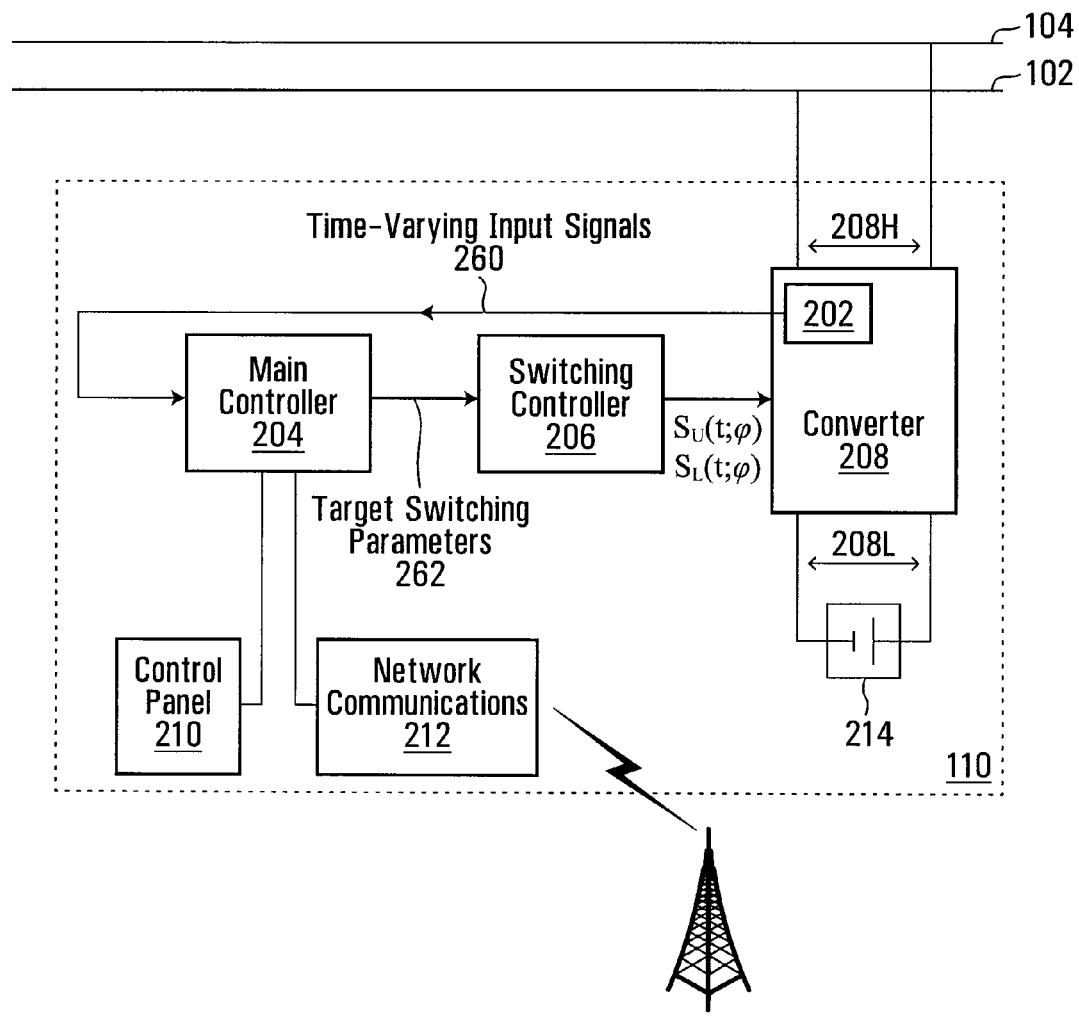
FIG. 2 is a block diagram of an energy storage system, including control apparatus and a converter, in accordance with a non-limiting embodiment of the present invention.

FIG. 2 shows possible components of the ESS 110, including sensors 202, a control apparatus, a converter 208 and a storage element 214. The control apparatus may consist of one or both of a main controller 204 and a switching controller 206. Other equipment may also be provided in the ESS 110, such as a control panel 210 (including screens, buttons, lights, etc.), and network communications equipment 212, such as components for establishing a wireline or wireless data connection (e.g., over Wifi, Bluetooth, Wimax, etc.).

Generally speaking, the sensors 202 detect the levels of various signals (e.g., voltages and currents) and report them in the form of time-varying input signals 260 to the main controller 204. The signal levels can be detected at various points of the electrical configuration, including within the ESS 110 and, in particular, within the converter 208. The time-varying input signals 260 are processed by the main controller 204, which computes target switching parameters 262 that characterize a desired switching behavior of the converter 208, as a function of the time-varying input signals 260. The switching controller 206 translates the target switching parameters 262 into switching control signals $S_U(t;\phi)$, $S_L(t;\phi)$ for the control of individual switching elements in the converter 208. Specifically, the switching control signals $S_U(t;\phi)$, $S_L(t;\phi)$ convey the time instants at which switching elements in the converter 208 are to be switched on and off. By faithfully responding to the switching control signals $S_U(t;\phi)$, $S_L(t;\phi)$ supplied by the switching controller 206, the converter 208 will exhibit a switching behavior that is in line with the desired switching behavior characterized by the target switching parameters 262 computed by the main controller 204. As will be shown below, judicious selection of the target switching parameters 262 as a function of the time-varying input signals 260 can lead to improved switching performance of the converter 208 in terms of such factors as efficiency and/or heat dissipation.

The converter 208 provides regulation of the voltage across a pair of conductors 102, 104 by controlling the direction and the amount of power output from a storage element 214. One of the conductors 102, 104 may be a ground conductor, although this is not a requirement. In certain non-limiting embodiments, the storage element 214 can be an ultra-capacitor bank (or "supercapacitor" bank). In other non-limiting embodiments, the storage element 214 can be implemented as a rechargeable battery. The converter 208 has two ends, referred to as a high-voltage end 208H and a low-voltage end 208L. In particular, the high-voltage end 208H has a pair of terminals leading to a respective pair of conductors 102, 104. The low-voltage end 208L has a pair of terminals connected to respective terminals of the storage element 214. The high-voltage end 208H is referred to as such because the voltage across it tends to be higher than the voltage across the low-voltage end 208L.

The converter 208 will now be described with additional reference to FIGS. 3A and 3B. The converter 208 is shown as a 3-phase DC-DC converter. However, in other applications, the converter 208 could be a single-phase or multi-phase converter. The converter 208 could be still another type of power converter.

In a non-limiting embodiment, the converter 208 includes a capacitor 302 across the high-voltage end 208H and a capacitor 304 across the low-voltage end 208L. The converter 208 also includes three switching modules 306 (one for each phase) placed in parallel across the high-voltage end 208H. In a non-limiting example embodiment, each of the switching modules 306 may be a Dual-IGBT Module. Each of the switching modules 306 has an "upper" switching sub-circuit connected to a "lower" switching sub-circuit at a junction 308. The junction 308 between the two switching sub-circuits of a given one of the switching modules 306 is connected to the storage element 214 (on the low-voltage side) via a respective inductor 310. Specifically, the inductor 310 has a first terminal connected to the junction 308 and a second terminal connected to a terminal of the storage element 214. A resistor may also be placed in parallel with each inductor (per phase) to safeguard against open circuit conditions.

Considering a given switching module 306 (shown more clearly in FIG. 3B), the upper switching sub-circuit includes a switching element 312 with a freewheeling diode 314. In a non-limiting embodiment, the switching element 312 has two signal terminals 316, 318 and a control terminal 320. It is noted that signal terminal 318 is electrically connected to the junction 308. The control terminal 320 receives the control signal $S_U(t;\phi)$ from the switching controller 206, where $\phi$ indicates the phase in question. The control signal $S_U(t;\phi)$ allows the switching element 312 to controllably either open or close the electrical connection between the two signal terminals 316, 318. If the connection is open, current is allowed to flow upwards (through the diode 314) but will be prevented from flowing downward (due to the diode 314 being reverse-biased). If the connection is closed, current will in that case be allowed to flow downward through the switching element 312.

In addition, a snubber capacitor 322 is placed across the signal terminals 316, 318 of the switching element 312. The snubber capacitor 322 is used for accumulating charge in the event that turn-off of the switching element 312 was carried out while there was still current flowing (downward) through the switching element 312.

The description of the lower switching sub-circuit is analogous to that of the upper switching sub-circuit. In particular, the lower switching sub-circuit includes a switching element 332 with a freewheeling diode 334. In a non-limiting embodiment, the switching element 332 includes two signal terminals 336, 338 and a control terminal 340. It is noted that signal terminal 336 is electrically connected to the junction 308. The control terminal 340 receives the control signal $S_L(t;\phi)$ from the switching controller 206, where $\phi$ indicates the phase in question. The control signal $S_L(t;\phi)$ allows the switching element 332 to controllably either open or close the electrical connection between the two signal terminals 336, 338. If the connection is open, current is allowed to flow upwards (through the diode 334) but will be prevented from flowing downward (due to the diode 334 being reverse-biased). If the connection is closed, current will in that case be allowed to flow downward through the switching element 332.

In addition, a snubber capacitor 342 is placed across the signal terminals 336, 338 of the switching element 332. The snubber capacitor 342 is used for accumulating charge in the event that turn-off of the switching element 332 was carried out while there was still current flowing (downward) through the switching element 332.

Suitable, but by no means limiting, realizations of the upper and lower switching elements 312, 332 include an insulated gate bipolar transistor (IGBT) and a metal oxide semiconductor field effect transistor MOSFET. As persons skilled in the art will appreciate, there may also be a resistor placed in parallel with the snubber capacitor.

Figure 3A:
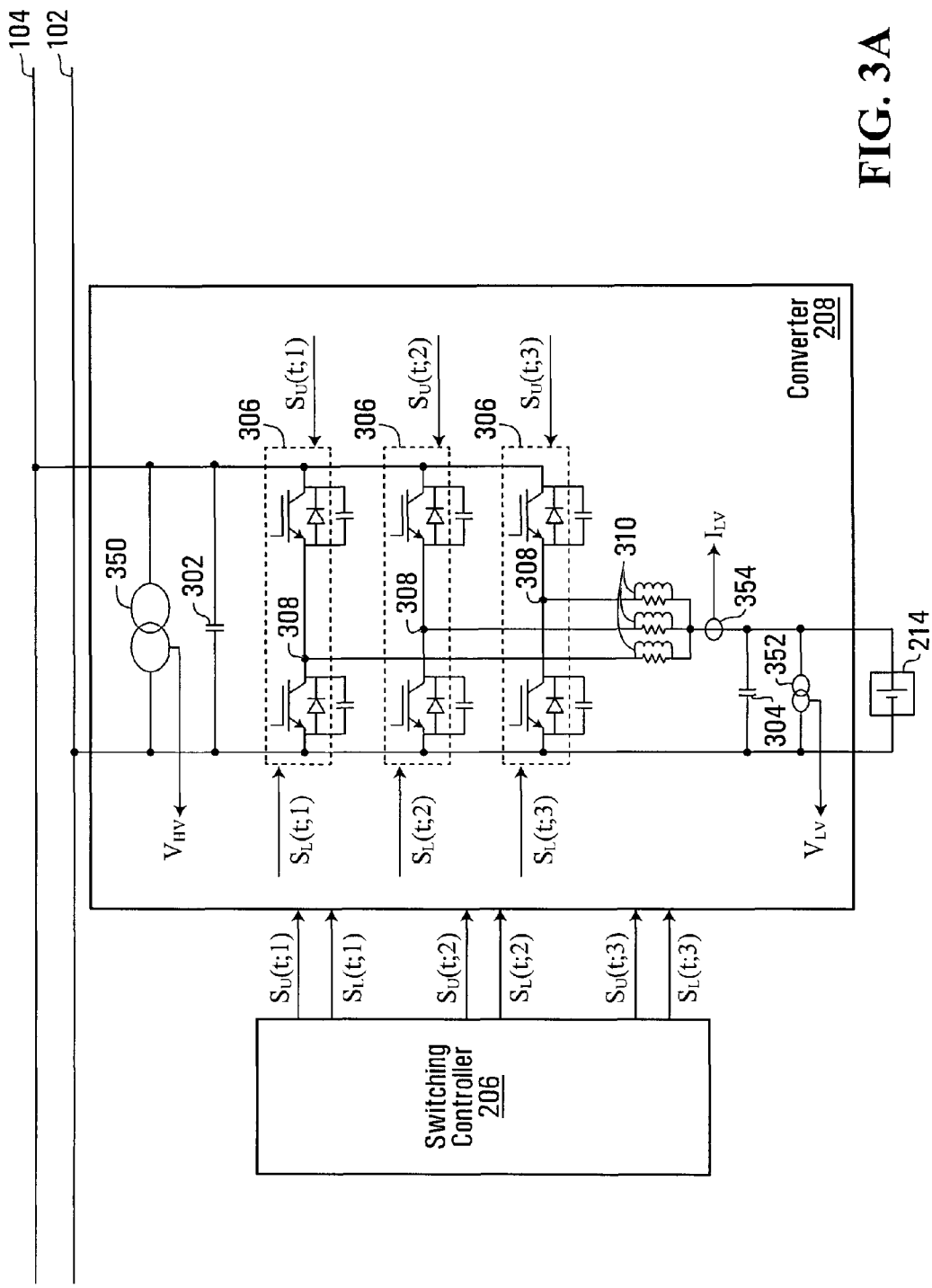
FIG. 3A is a circuit diagram of a three-phase converter, in accordance with a non-limiting embodiment of the present invention.
Figure 3B:
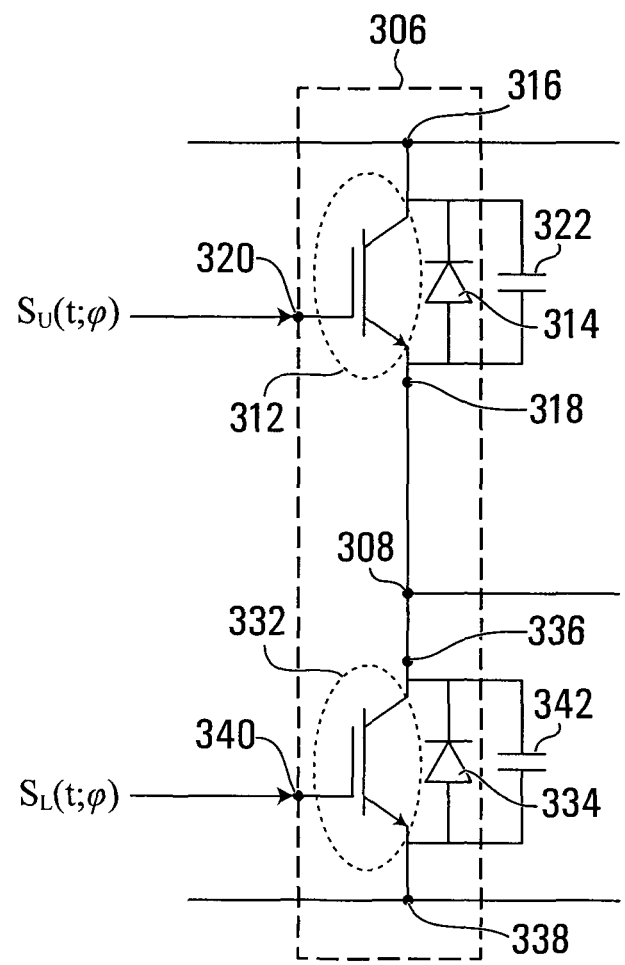
FIG. 3B is a circuit diagram of one phase of a converter, including two switching sub-circuits, in accordance with a non-limiting embodiment of the present invention.

In addition, with continued reference to FIG. 3A, the sensors 202 may comprise a voltage sensor 350 across the high-voltage end 208H, a voltage sensor 352 across the low-voltage end 280L and a current sensor 354 that measures the current flowing through the storage element 214. Voltage sensor 350 outputs a signal indicative of a sensed voltage $V_{HV}$ across the high-voltage end 208H. Voltage sensor 352 outputs a sensed voltage signal $V_{LV}$ across the low-voltage end 208L. For its part, the current sensor 354 outputs a signal indicative of a sensed average output current $I_{LV}$ through the low-voltage end 208L. Collectively, the time-varying input signals 260 convey the sensed voltages $V_{HV}$, $V_{LV}$ and the sensed average output current $I_{LV}$ to the main controller 204 for generation of the target switching parameters 262.

It should be appreciated that the converter 208 may include still other components, including but not limited to resistors, capacitors, inductors, diodes, transformers, transistors, etc. Also, various subsets of circuit components of the converter 208 may be implemented using integrated circuit technology. Furthermore, omission of any component is for simplicity only and does not necessarily mean that the component's absence is a requirement.

Figure 4:
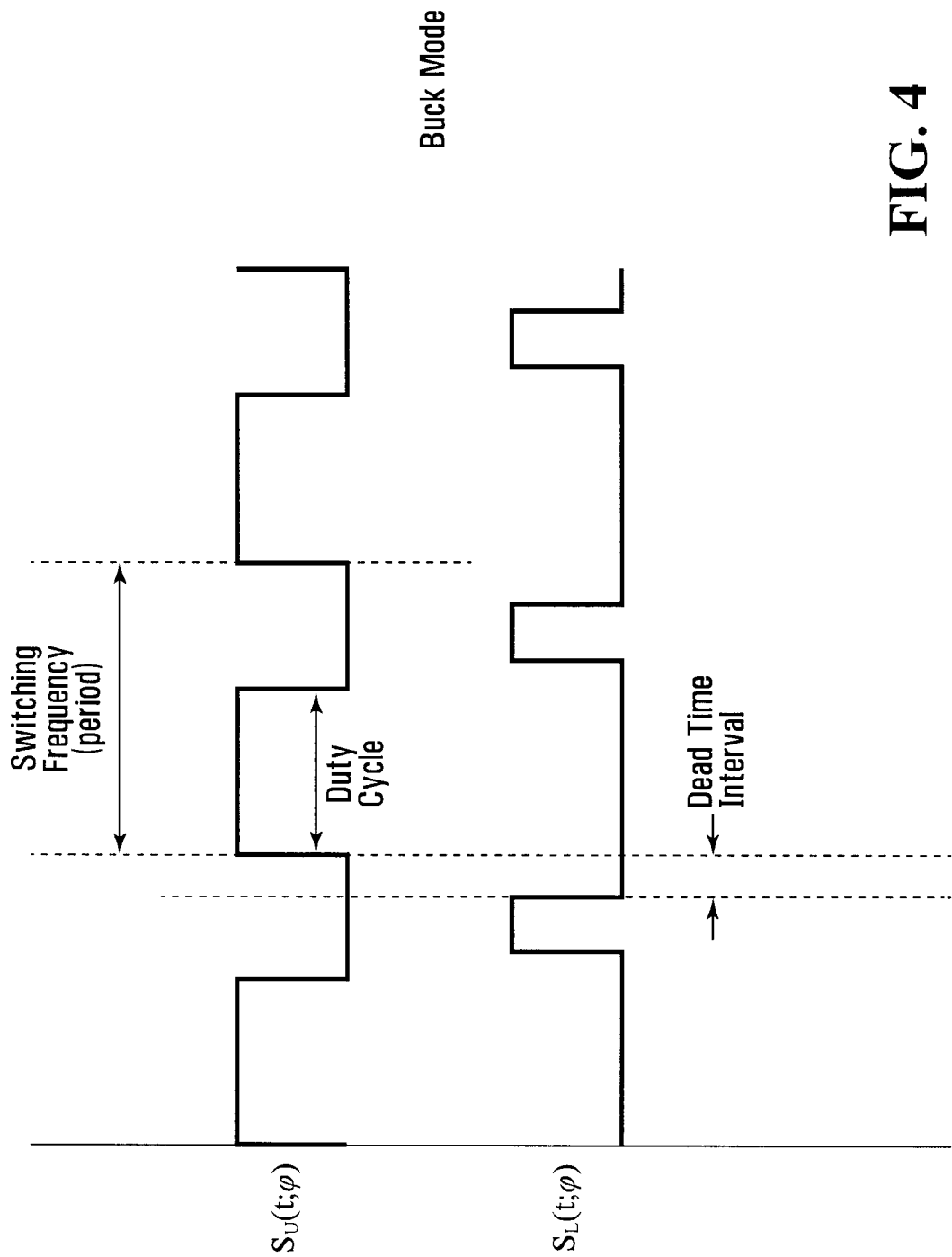
FIG. 4 is a timing diagram illustrating the notions of a duty cycle, switching frequency and dead time corresponding to a switching cycle carried out by the converter, in accordance with a non-limiting embodiment of the present invention.

The switching elements 312, 332 of the converter 208 are turned on/off on the basis of the switching control signals $S_U(t;\phi)$, $S_L(t;\phi)$ provided by the switching controller 206. This creates a switching pattern that can be characterized by a plurality of switching parameters, such as a duty cycle, a dead time and a switching frequency (or period). Specifically, with reference to FIG. 4, there is shown a signal diagram illustrating a switching pattern of the switching elements 312, 332, based on variations in the switching control signals $S_U(t;\phi)$, $S_L(t;\phi)$. In particular, it will be observed that switching control signal $S_U(t;\phi)$ is asserted and then de-asserted (and then re-asserted) in an alternating, cyclical pattern. The duration of this cycle is the "switching period", and the inverse of this value is the "switching frequency". The switching frequency can be variable, meaning that the duration of the switching period can vary over time. The percentage of time during a switching period that switching control signal $S_U(t;\phi)$ stays asserted is referred to as the "duty cycle". In addition, during the time when switching control signal $S_U(t;\phi)$ is de-asserted, switching control signal $S_L(t;\phi)$ is asserted for a certain amount of time and then de-asserted. (The two terms are sometimes used interchangeably.) The interval between de-assertion of switching control signal $S_L(t;\phi)$ and re-assertion of switching control signal $S_U(t;\phi)$ is referred to herein as the dead time interval and its duration is the "dead time". It will be observed that both switching control signals $S_U(t;\phi)$, $S_L(t;\phi)$ are de-asserted during the dead time interval.

It can therefore be appreciated that the switching behavior of the converter 208 can be parametrized according to a duty cycle, a dead time and a switching frequency, any or all of which may be time varying. The duty cycle, dead time and switching frequency can be made to correspond to a "target duty cycle", a "target dead time" and a "target switching frequency", respectively, by providing the target switching parameters 262 to the switching controller 206. The switching controller 206 transforms the target switching parameters 262 (i.e., the target duty cycle, the target dead time and the target switching frequency) into the switching control signals $S_U(t;\phi)$, $S_L(t;\phi)$. The switching controller 206 can be implemented as a microprocessor-based controller, such as a variable-frequency pulse width modulator. The switching controller 206 can have an input for receiving the target switching parameters 262 from the main controller 204. In other embodiments, the switching controller 206 may be amalgamated with main controller 204 and/or with the converter 208. Still other implementations are possible and will be apparent to those of skill in the art.

Figure 5:
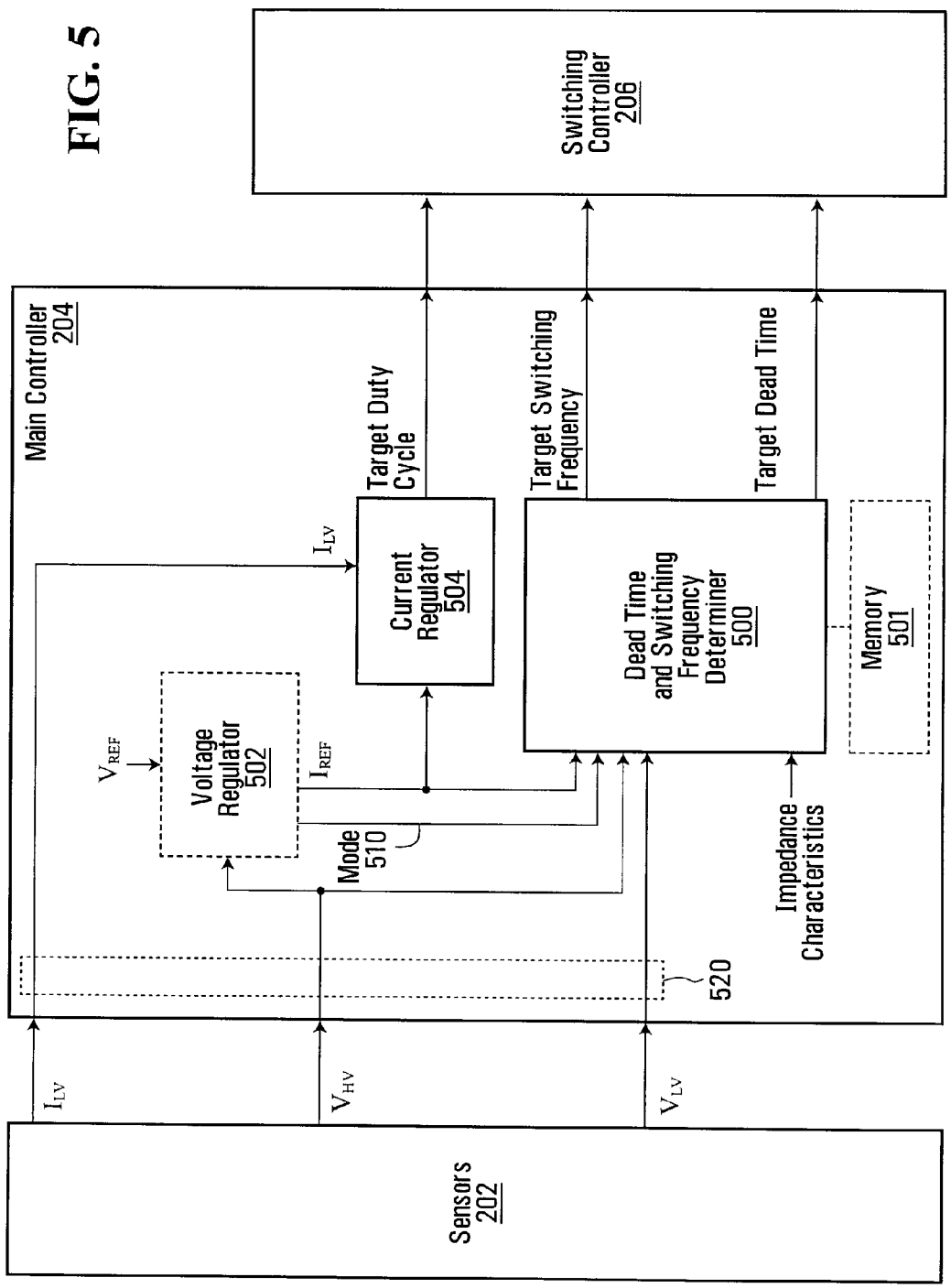
FIG. 5 is a block diagram of a controller used to control operation of the converter, in accordance with a non-limiting embodiment of the present invention.

The target duty cycle, target switching frequency and target dead time (collectively, the target switching parameters 262) can be set by the main controller 204, which implements an adaptive feedback regulation mechanism. The main controller 204 will now be described with reference to FIG. 5. The main controller 204 comprises an optional voltage regulator 502 cascaded with a current regulator 504, as well as a dead time and switching frequency determiner 500. The main controller 204 may include other components/functional modules.

The voltage regulator 502, which is optional, determines a time-varying desired low-voltage-side average output current $I_{REF}$ based on a comparison of the sensed voltage signal $V_{HV}$ and a reference voltage $V_{REF}$. In other applications, the desired low-voltage-side average output current $I_{REF}$ can be generated directly without the use of voltage regulator. The sign (+ or −) of the desired low-voltage-side average output current $I_{REF}$ is an indication of the desired direction of current flow between the high voltage side and low voltage side. The sign of the desired low-voltage-side average output current $I_{REF}$ determines the mode of operation (i.e., buck or boost) of the converter 208. Nevertheless, the voltage regulator 502 can produce a separate mode flag 510 that explicitly specifies the desired mode of operation of the converter 208.

A signal conveying the desired low-voltage-side average output current $I_{REF}$ is provided to the current regulator 504 and to the dead time and switching frequency determiner 500. It should be understood that the mode flag 510 is optional, as its value can be derived from the desired low-voltage-side average output current $I_{REF}$. The current regulator 504 determines a time-varying target duty cycle based on a comparison of the desired low-voltage-side average output current $I_{REF}$ and the sensed average output current $I_{LV}$, which was received from the current sensor 354. A signal conveying the target duty cycle is provided to the switching controller 206.

For its part, the dead time and switching frequency determiner 500 receives the mode flag 510 from the voltage regulator 502, and also receives signals conveying the sensed voltages $V_{HV}$, $V_{LV}$ from voltage sensors 350, 352. In addition, the dead time and switching frequency determiner 500 has knowledge of the impedance characteristics of the converter 208. This information can be stored in a memory 501 connected to or accessible by the main controller 204. In particular, information stored in the memory 501 can include the values of various capacitances, inductances and resistances, and their respective circuit configuration, as used in the converter 208. The dead time and switching frequency determiner 500 determines a target dead time and a target switching frequency based on the sensed voltages $V_{HV}$, $V_{LV}$, the desired low-voltage-side average output current $I_{REF}$, the mode flag 510 (optional) and the known impedance characteristics. The target dead time and the target switching frequency are provided to the switching controller 206. It will be noted that the target dead time and the target switching frequency are time varying.

In operation, it is desirable to set the target duty cycle to a value that ensures that the sensed average output current $I_{LV}$ will match the desired low-voltage-side average output current $I_{REF}$.; It is also desirable to set the target dead time and the target switching frequency to values that result in soft switching of the switching elements 312, 332.

In some non-limiting embodiments, a switching scheme is characterized as "soft switching" when it can achieve either "zero-voltage" or "zero-current" with very limited tradeoff of other performance such as switch conduction loss or other component loss, size, cost and stability. In other non-limiting embodiments, a switching scheme is characterized as "soft switching" when it provides "zero-voltage" switching all of the time and "zero-current" or "minimum-current" most of time.

Numerous approaches to computing suitable values for the target duty cycle, the target dead time and the target switching frequency are possible, as will now be described.
Analytical Approach One specific approach to determining suitable values for the target dead time and the target switching frequency can be referred to as the "analytical approach". The analytical approach uses circuit analysis to compute values for the dead time and the switching frequency that result in soft switching of the switching elements 312, 332 as a function of certain operational conditions. By setting the target dead time and the target switching frequency equal (or approximate) to the computed values of the dead time and the switching frequency, the switching controller 206 can be expected to exhibit soft switching.

In accordance with the analytical approach, it will firstly be recognized that to achieve high power density and reduce the size of the inductors 310, the converter 208 can be designed to operate around the boundary of discontinuous conducting mode (DCM) and continuous conduction mode (CCM). Such operation also allows low diode reverse recovery loss.

In addition, it will be recalled that snubber capacitor 322 (or 342) is provided across switching element 312 (or 332) to achieve soft turn-off. However, snubber capacitor 322 (or 342) will introduce additional turn-on loss under a typical (hard) switching control scheme where a residual charge that is present across snubber capacitor 322 (or 342) at the time of turn-on is discharged through switching element 312 (or 332). Thus, to ensure that switching element 312 (or 332) is able to turn on at zero loss, the energy stored in snubber capacitor 322 (or 342) needs to be fully discharged before switching element 312 (or 332) is turned on.

Based on this principle, a dynamic gate signal complementary soft switching control scheme can be devised, thereby to ensure that the switching elements 312, 332 can turn on under zero-voltage and/or zero-current conditions while softening turn-off. The present switching scheme delivers zero-voltage switching over a wide dynamic load range and, in addition, delivers a low commutation current, thereby keeping the component loss low and boosting the control performance.

Figure 8:
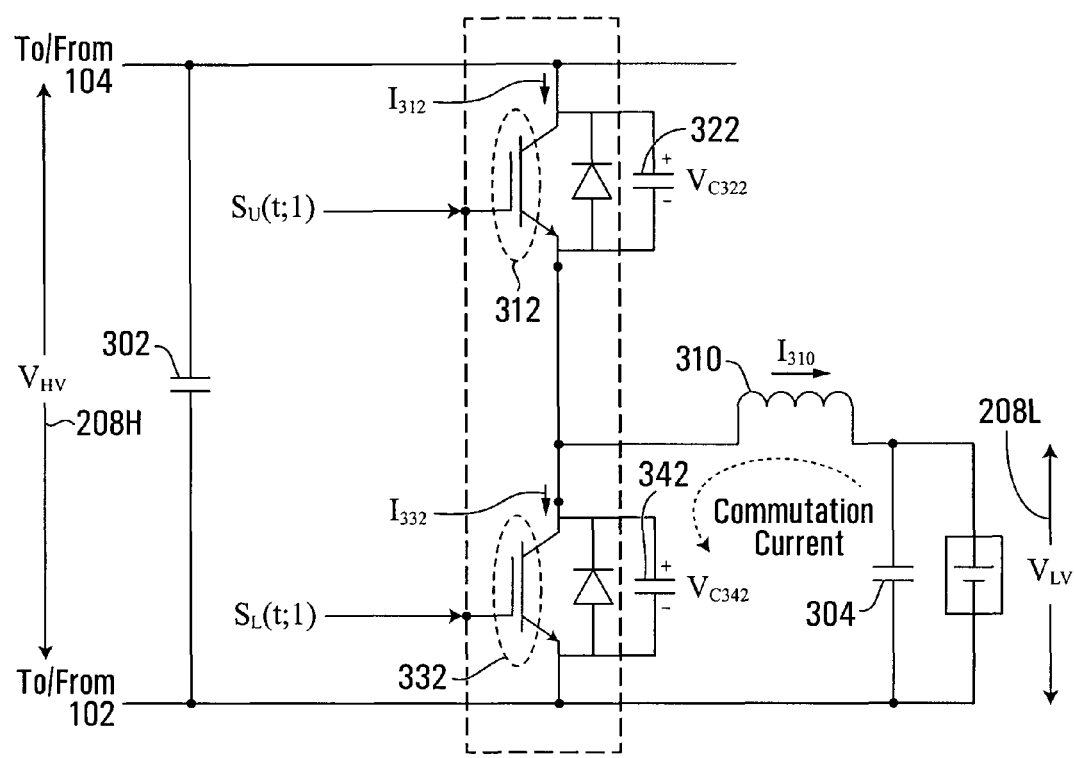
FIG. 8 is a circuit diagram illustrating operation of the switching sub-circuits of FIG. 3B in buck mode, in accordance with a non-limiting embodiment of the present invention.

FIG. 8 shows a circuit diagram of a single phase ($\phi$=1) of the converter 208 in buck mode. It will be recalled that, in buck mode, power is transferred from the high-voltage 208H end to the low-voltage end 208L through switching action of switching element 312 (the "active" switching element in buck mode), as controlled by switching control signal $S_U(t; 1)$. Switching element 332 is considered to be the "inactive" switching element in buck mode. According to a non-limiting embodiment of the present invention, the inactive switching element 332 is used as an auxiliary switch to build a time-varying "commutation current" so as to discharge the energy of the snubber capacitor 322 across the active switching element during a dead-time period, thus allowing the active switching element 312 to subsequently turn on under a zero-voltage condition. In this way, both soft turn-on and soft turn-off can be achieved, which is collectively referred to as soft switching. Also, the parasitic ring problem that commonly exists in DCM operation can be avoided owing to the smooth inductor current transition.

Figure 9:
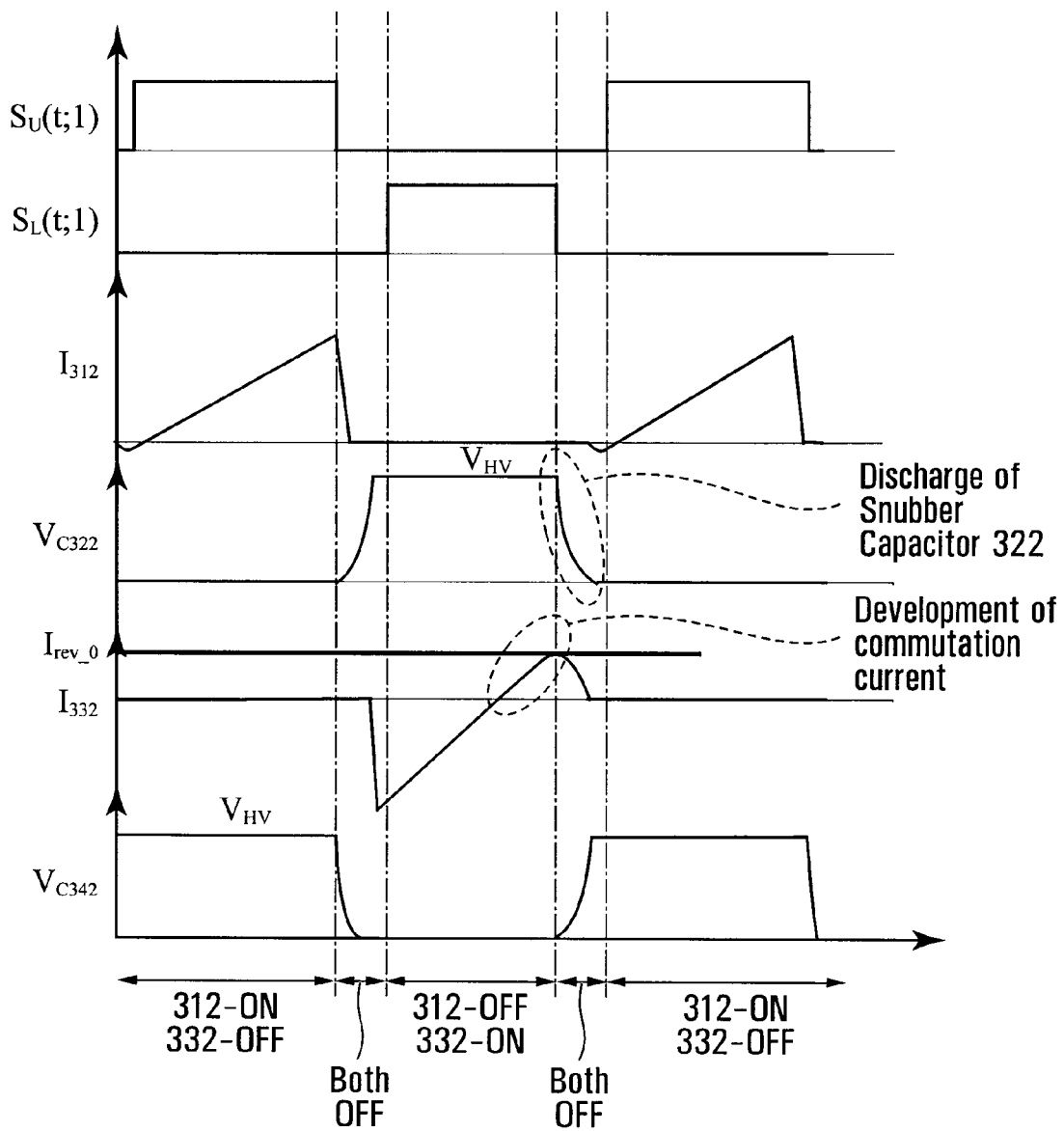
FIG. 9 is a timing diagram illustrating various signal levels in the circuit diagram of FIG. 8, in accordance with a non-limiting embodiment of the present invention.

A non-limiting example detailed transient operating waveform depicting a soft switching control scheme is shown in FIG. 9 (for operation in buck mode). It will be noted that turning on the inactive switching element 332 while active switching element 312 is turned off causes development of the commutation current. The commutation current is a current through the inductor and the inactive switching element 332 that is in a direction opposite to the direction of average current flow. When the inactive switching element 332 is turned off to begin the dead time interval, the commutation current starts from an initial value $I_{rev\_0}$, which tends to discharge the snubber capacitor 322. (which is connected across the active switching element 312)

Now, if the active switching element 312 is fully discharged before or at the moment when the active switching element 312 turns back on again, the active switching element 312 will be turned on at substantial zero voltage and/or zero current.

Thus, it would be desirable for the initial commutation current $I_{rev\_0}$ to be sufficiently high so as to result in full discharge of the snubber capacitor 322 during the dead time interval, i.e., the period of time when both switching elements are turned off. However, too high an initial commutation current $I_{rev\_0}$ could bring about conduction losses and other component current stress. Therefore, the dead time and the switching frequency should be carefully controlled to achieve a suitable value for the initial commutation current $I_{rev\_0}$. For example, the switching frequency should be sufficiently low to allow the development of a suitable initial commutation current $I_{rev\_0}$, and the dead time should be sufficiently long to allow the snubber capacitor 322 to be fully discharged. On the other hand, if the dead time is set to too high a value, the snubber capacitor 322 will become recharged, which will cause turn-on loss, and this could also cause stability problems by bringing about peak-to-peak phase current and transistor (switching element) conduction losses.

One non-limiting way for the dead time and switching frequency determiner 500 to determine suitable values for the dead time and the switching frequency will now be described in further detail for a single phase of the converter 208. It will be appreciated that an identical description applies to the other phases of a three-phase or multi-phase converter.

Figure 19:
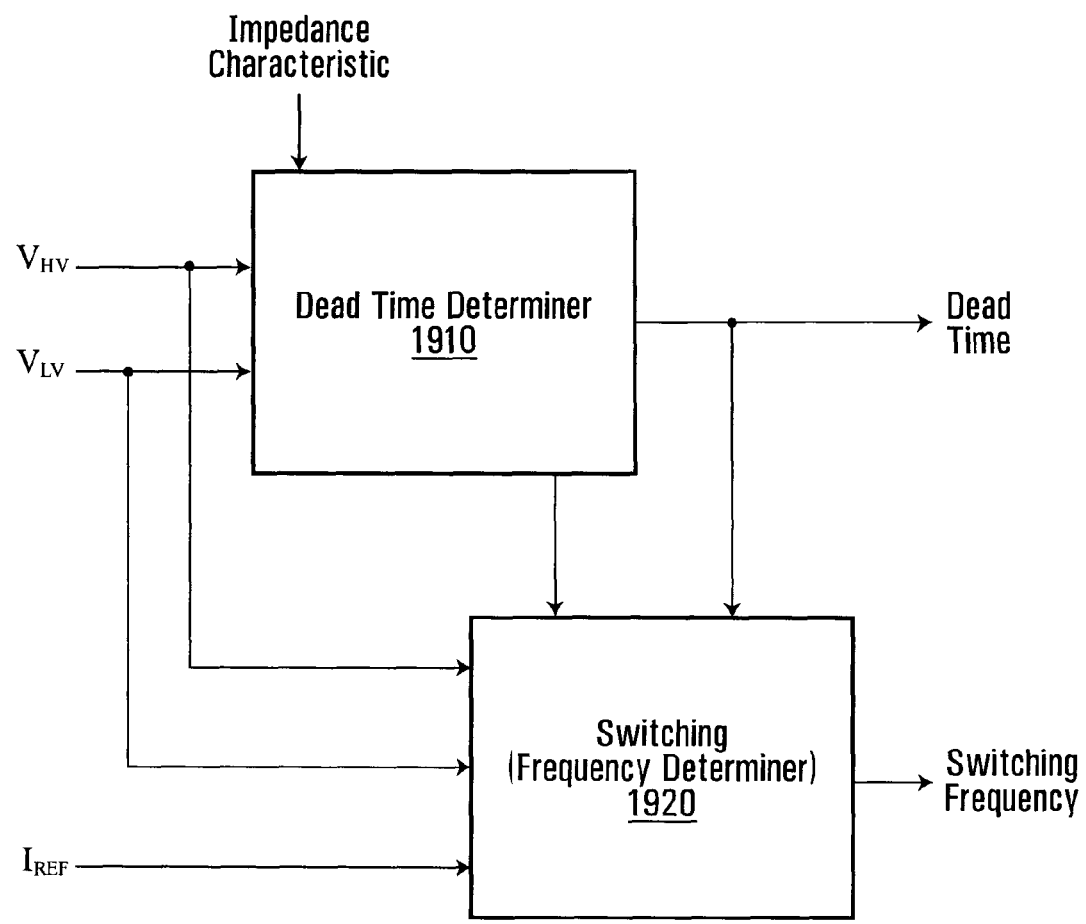
FIG. 19 is a block diagram conceptually separating functionality of one functional module of the control apparatus of FIG. 5 into separate functional modules, in accordance with a non-limiting embodiment of the present invention.

For illustrative purposes, reference is made to FIG. 19, wherein the functionality of the dead time and switching frequency determiner 500 is broken down conceptually into a dead time determiner 1910 and a switching frequency determiner 1920. The dead time determiner 1910 outputs a suitable value for the dead time, which is computed based on the sensed voltages $V_{HV}$, $V_{LV}$ and at least one circuit characteristic (e.g., an impedance characteristic) of the converter 208. In addition, the dead time determiner 1910 determines a suitable value for the initial commutation current $I_{rev\_0}$, which is provided to an input of the switching frequency determiner 1920. For its part, the switching frequency determiner 1920 outputs a suitable value for the switching frequency, which is computed based on the sensed voltages $V_{HV}$, $V_{LV}$, the desired low-voltage-side average output current $I_{REF}$, as well as the dead time and the initial commutation current $I_{rev\_0}$ determined by dead time determiner 1910.

Analytically Computed Dead Time

Figure 10:
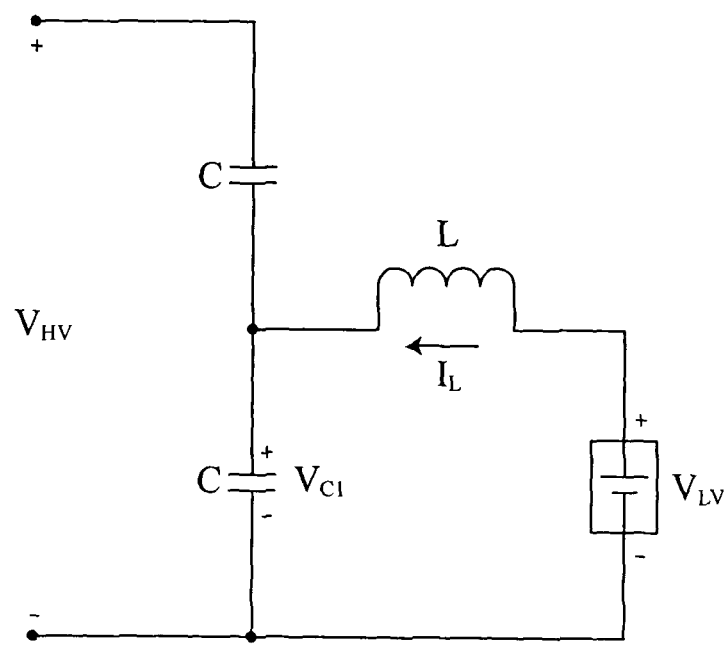
FIG. 10 is an equivalent circuit diagram corresponding to the circuit of FIG. 8, during a dead time interval, in accordance with a non-limiting embodiment of the present invention.

During the time when both switching elements 312, 332 are off (i.e., during the dead time interval), the equivalent circuit diagram can be shown as in FIG. 10.

Buck Mode

In buck mode, to achieve soft switching when turning on the active switching element (in buck mode, this is switching element 312) at the end of the dead time interval, the initial commutation current $I_{rev\_0}$ needs to satisfy: (i) zero current through the inductor 310; (ii) zero voltage $V_{c322}$ across the active switch 312. The resulting required minimum initial commutation current, denoted $I_{rev\_0\_min}$, is:

$$I_{rev\_o\_min} = \frac{V_{HV}}{Z} \cdot \sqrt{1 - 2\frac{V_{LV}}{V_{HV}}} \qquad \text{(Eq-1)}$$

where Z is the characteristic impedance of the resonant circuit:

$$Z = \sqrt{\frac{L}{2C}}$$

Figure 15:
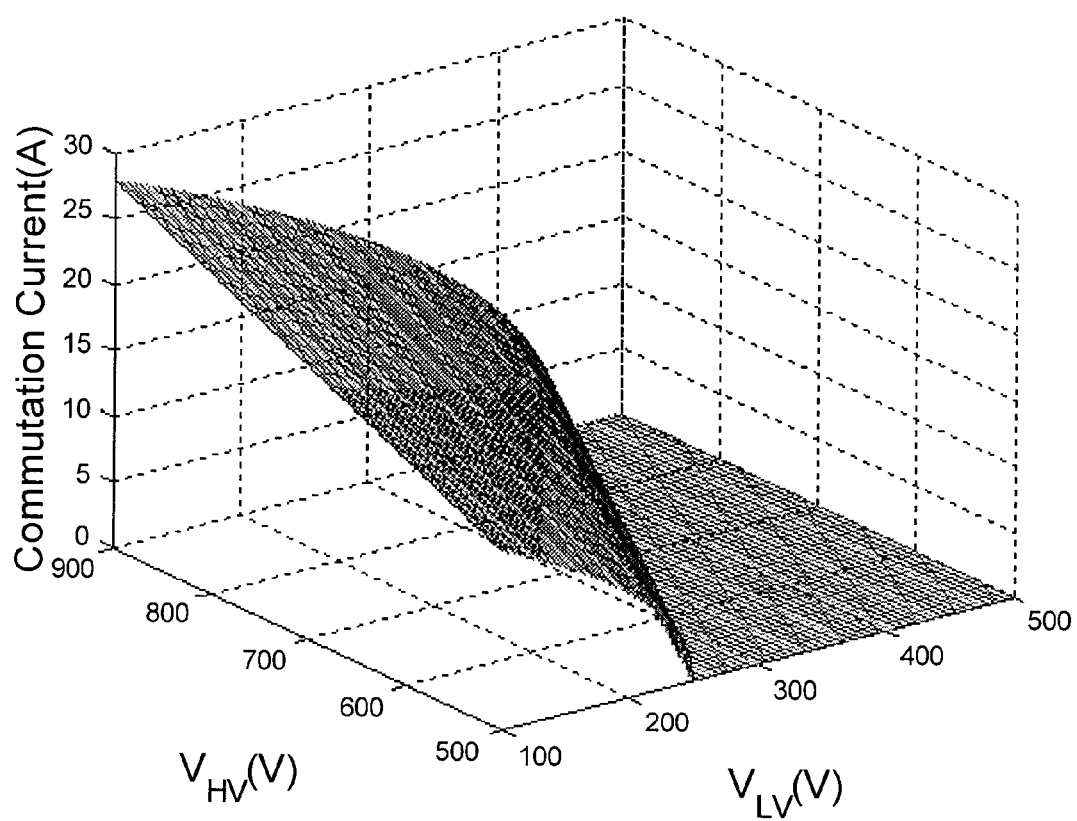
FIG. 15 is an example plot of required minimum initial commutation current in buck mode as a function of the voltage across the high-voltage side and the voltage across the low-voltage side of the converter, in accordance with a non-limiting embodiment of the present invention.

The required minimum initial commutation current $I_{rev\_0\_min}$ is thus a function of $V_{HV}$ and $V_{LV}$. FIG. 15 shows this function in greater detail over a certain voltage range as an example, based on equation (Eq-1) above. By way of non-limiting example, the circuit characteristic impedance used for the purposes of FIG. 15 is 28.3 ohms. Of course, other inductances and snubber capacitor sizes will lead to different values on the reference graph, but the shape or behavior performance according to the input/output voltage variation will be similar. As can be observed, the lower the voltage ratio $V_{LV}/V_{HV}$, the larger the required minimum initial commutation current $I_{rev\_0\_min}$. When the voltage ratio $V_{LV}/V_{HV}$ is higher than 0.5, then actually no commutation current (from turning on the auxiliary switching element, which is switching element 332 in buck mode) is needed. This is because, in this case, the voltage difference across the inductor 310 can generate enough "equivalent" commutation current by itself to discharge the snubber capacitor 322, as long as enough dead time is given.

The required minimum initial commutation current $I_{rev\_o\_min}$ is the calculated current which guarantees that at the end of the dead time interval, the voltage across and the current through the main switching element 312 become zero (i.e., zero-voltage zero-current switching). However, for practical purposes, in order to account for computation precision and hardware error allowance, more initial commutation current may be provided to ensure that the snubber capacitor 322 is fully discharged. Under this circumstance, the active switching element 312 can still achieve zero-voltage switching. By making the initial commutation current $I_{rev\_0}$ higher than the required minimum commutation current $I_{rev\_0\_min}$, this will speed up discharging of the snubber capacitor 322, which provides a wider time margin for the active switching element 312 to turn on at zero voltage. The trade-off, however, is that excessive commutation current will introduce more switch conduction loss and other passive component loss.

Now, for a given $I_{rev\_0} \geq I_{rev\_0\_min}$, the required minimum dead time $t^*_d$ to fully discharge the snubber capacitor 322 is given by:

$$t^*_d = \frac{1}{\omega} \cdot \arccos \frac{-V_{LV} \cdot (V_{HV} - V_{LV}) + I_{rev\_o} \cdot Z \cdot \sqrt{2V_{HV}V_{LV} - V_{HV}^2 + I_{rev\_o}^2 Z^2}}{V_{LV}^2 + I_{rev\_o}^2 Z^2} \qquad \text{(Eq-2)}$$

where ω is the angular resonance frequency of the circuit.

Figure 16:
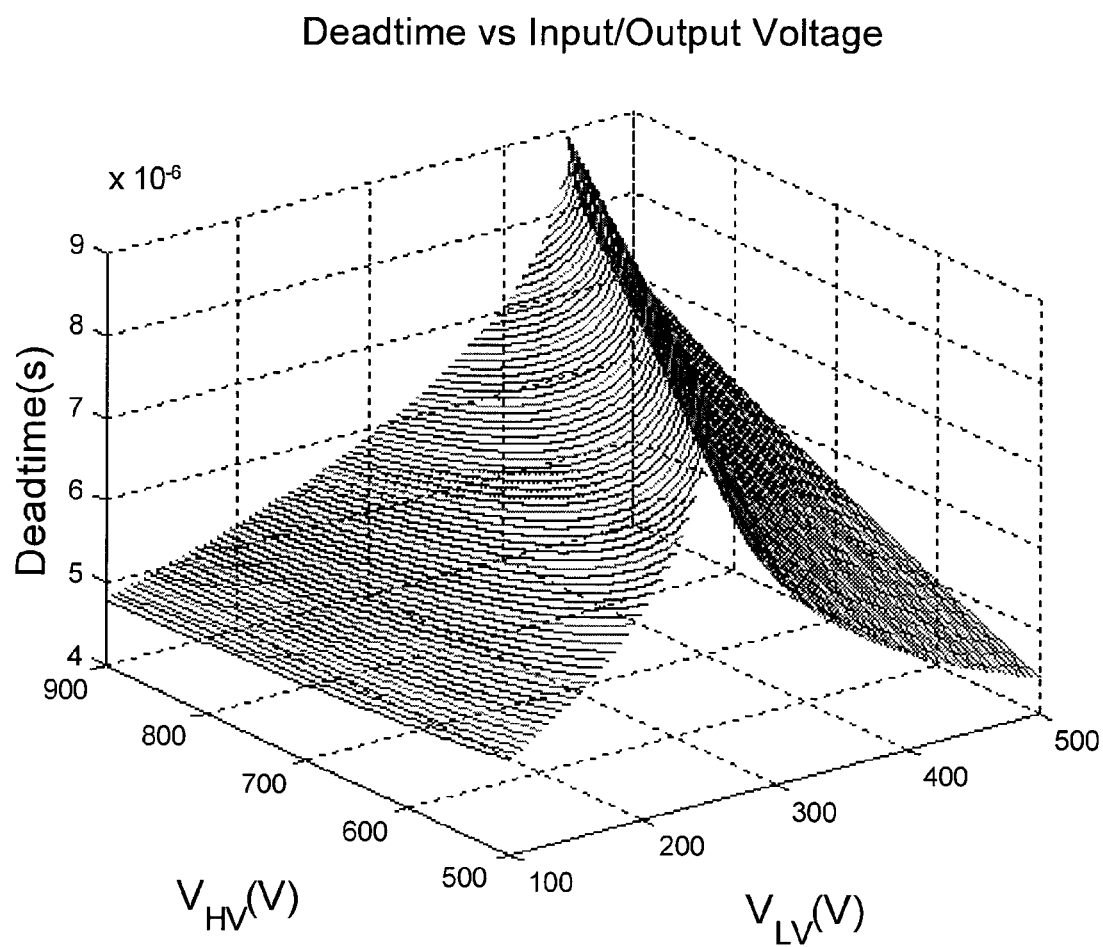
FIG. 16 is an example plot of required minimum dead time in buck mode as a function of the voltage across the high-voltage side and the voltage across the low-voltage side of the converter, for a given value of the initial commutation current, in accordance with a non-limiting embodiment of the present invention.

FIG. 16 shows the required minimum target dead time in buck mode as a function of $V_{HV}$ and $V_{LV}$ for a given value of the initial commutation current $I_{rev\_0}$ obtained from FIG. 15, according to equation (Eq-2). The circuit characteristic impedance and circuit angular resonant frequency used in this figure are 28.3 ohms and 0.35M. Various inductance and snubber capacitor size will lead to different numerical on the reference graph, but the shape or behavior performance according to the input/output voltage variation will be very similar. As can be observed, the closer of voltage ratio $V_{LV}/V_{HV}$ to 0.5, the longer the required minimum target dead time $t_d$. If the dead time is shorter than the required minimum target dead time but within a certain limited range, then the voltage across the main switching element (e.g., switching element 312 in buck mode) may be slightly higher than 0, which means that switching element 312 cannot achieve perfect zero-voltage switching, although the switching loss generated from this voltage will be small.

Boost Mode

Similarly, in boost mode, to achieve soft switching when turning on the active switching element (in boost mode, this is switching element 332) at the end of the dead time interval, the initial commutation current $I_{rev\_0}$ needs to satisfy: (i) zero current through the inductor 310; (ii) zero voltage $V_{c342}$ across the active switch 332. The resulting required minimum initial commutation current, denoted $I_{rev\_0\_min}$, is:

$$I_{rev\_o\_min} = \frac{V_{HV}}{Z} \cdot \sqrt{2\frac{V_{LV}}{V_{HV}} - 1} \qquad \text{(Eq-3)}$$

Figure 20:
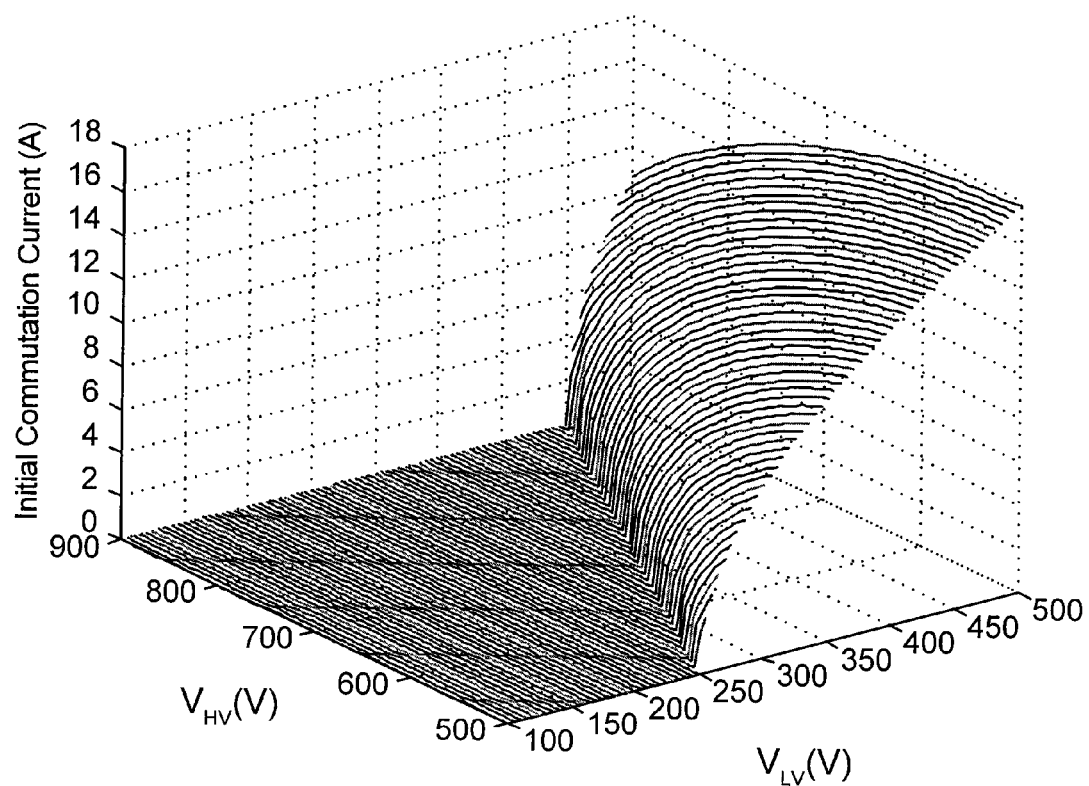
FIG. 20 is analogous to FIG. 15, but pertains to operation in boost mode rather than in buck mode.

Similar to FIG. 15, FIG. 20 shows a graphical representation of $I_{rev\_o\_min}$ over a certain voltage range as an example, based on equation (Eq-3) above. By way of non-limiting example, the circuit characteristic impedance used for the purposes of FIG. 20 is 28.3 ohms. Of course, other inductances and snubber capacitor sizes will lead to different values on the reference graph, but the shape or behavior performance according to the input/output voltage variation will be similar. As can be observed, in boost mode, the lower the voltage ratio $V_{LV}/V_{HV}$, the larger the required minimum initial commutation current $I_{rev\_0\_min}$. When the voltage ratio $V_{LV}/V_{HV}$ is lower than 0.5, then actually no commutation current (from turning on the auxiliary switching element, which is switching element 312 in boost mode) is needed. This is because, in this case, the voltage difference across the inductor 310 can generate enough "equivalent"

commutation current by itself to discharge the snubber capacitor 342, as long as enough dead time is given.

Similar to buck mode, the required minimum initial commutation current $I_{rev\_o\_min}$ is the calculated current which guarantees that at the end of the dead time interval, the voltage across and the current through the main switching element 332 become zero (i.e., zero-voltage zero-current switching). However, for practical purposes, in order to account for computation precision and hardware error allowance, more initial commutation current may be provided to ensure that the snubber capacitor 342 is fully discharged. Under this circumstance, the active switching element 332 can still achieve zero-voltage switching. By making the initial commutation current $I_{rev\_o}$ higher than the required minimum commutation current $I_{rev\_o\_min}$, this will speed up discharging of the snubber capacitor 342, which provides a wider time margin for the active switching element 332 to turn on at zero voltage. The trade-off, however, is that excessive commutation current will introduce more switch conduction loss and other passive component loss.

Now, for a given $I_{rev\_o} \geq I_{rev\_o\_min}$, the required minimum dead time $t^*_d$ to fully discharge the snubber capacitor 342 is given by:

$$t^*_d = \frac{1}{\omega} \cdot \arccos \frac{-V_{LV} \cdot (V_{HV} - V_{LV}) + I_{rev\_o} \cdot Z \cdot \sqrt{-2V_{HV}V_{LV} + V_{HV}^2 + I_{rev\_o}^2 Z^2}}{(V_{HV} - V_{LV})^2 + I_{rev\_o}^2 Z^2} \quad (Eq\text{-}4)$$

The dead time behavior in boost mode is similar to that in buck mode but the value of the required minimum dead time diverges when a value of $I_{rev\_o}$ higher than $I_{rev\_o\_min}$ is used.

Analytically Computed Switching Frequency

Figure 11:
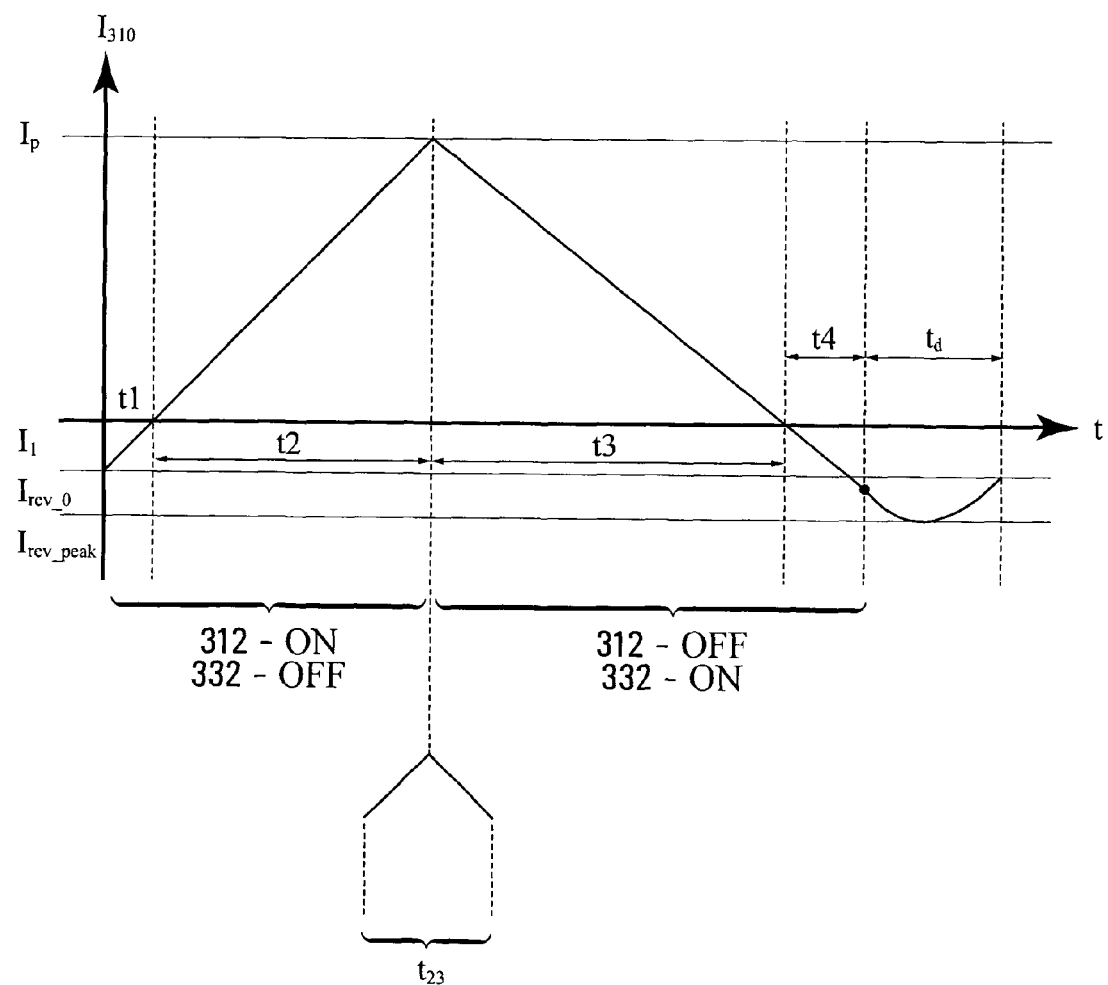
FIG. 11 is a timing diagram of a transient phase inductor current over a full switching cycle, in accordance with a non-limiting embodiment of the present invention

The dead time and switching frequency determiner 500 also computes a suitable value for the switching frequency. The transient phase inductor current (i.e., the current through inductor 310) in one switching cycle is shown in FIG. 11. It will be appreciated that a switching cycle that is too short cannot guarantee soft switching due to there being not enough dead time or commutation current, while a switching cycle that is too long will introduce extra conduction loss via the switching elements 312, 332 and inductors 310.

From an analytical perspective, it will be seen that one complete switching cycle consists of five time sections which include:

Buck Mode $$t_1 = \frac{L \cdot I_1}{V_{HV} - V_{LV}}$$

$$t_2 = \frac{L \cdot I_P}{V_{HV} - V_{LV}}$$

$$t_3 = \frac{L \cdot I_P}{V_{LV}}$$

$$t_4 = \frac{L \cdot I_{rev\_o}}{V_{LV}}$$

$t_d$ = dead time that is $\geq t^*_d$

Boost Mode $$t_1 = \frac{L \cdot I_1}{V_{LV}}$$

$$t_2 = \frac{L \cdot I_P}{V_{LV}}$$

$$t_3 = \frac{L \cdot I_P}{V_{HV} - V_{LV}}$$

$$t_4 = \frac{L \cdot I_{rev\_o}}{V_{HV} - V_{LV}}$$

$t_d$ = dead time that is $\geq t^*_d$.

In the above equations, $I_p$ is the transient peak current in the average current direction.

Also in the above equations, I1 is the transient current when the voltage across the active switching element (312 in buck mode, 332 in boost mode) is equal to zero. I1 will be equal to zero when $I_{rev\_o}$ is equal to $I_{rev\_o\_min}$ as discussed in last section, which means the active switch will turn on at both zero voltage and zero current. But a moderate amount of allowance given to $I_{rev\_o}$ (for example 10% more than $I_{rev\_o\_min}$) will create a time slot ($t_1$ in FIG. 11) during which the active switch is turned on. This can bring reliability and flexibility, which can be useful in high-power applications. On the other hand, the small amount of current I1 will go through the diode across the main switching element, which introduces a very slight diode conduction loss.

It will be noted that there is a further period $t_{23}$ (between $t_2$ and $t_3$) during which both switching elements 312, 332 are also turned off. However, this time period is neglected, as it takes much less time to charge and discharge the snubber capacitors 322, 342 during this interval, since the value of $I_p$ is much higher than $I_{rev\_o}$.

Also from FIG. 15, the phase average current can be expressed as:

$$I_{avg} = \frac{-0.5 \cdot t_1 \cdot I_1 + 0.5 \cdot (t_2 + t_3) \cdot I_p - 0.5 \cdot t_4 \cdot I_{rev\_o} - A}{t_1 + t_2 + t_3 + t_4 + t_d} \quad (Eq\text{-}5)$$

where A is the area value during the dead time interval, i.e., the time when both switching elements 312, 332 are turned off.

Thus, according to equation (Eq-5), for a given average current demand $I_{avg}$, and substituting for $t_1$, $t_2$, $t_3$ and $t_4$, one obtains:

Buck Mode $$I_p = I_{avg} + \sqrt{I_{avg}^2 + \frac{2V_{LV} \cdot (V_{HV} - V_{LV})}{L \cdot V_{HV}} \cdot \left[\frac{L \cdot I_{rev\_o}^2 + 2 \cdot L \cdot I_{rev\_o} \cdot I_{avg}}{2 \cdot V_{LV}} + \frac{L \cdot I_1^2 + 2 \cdot L \cdot I_{avg} \cdot I_1}{2 \cdot (V_{HV} - V_{LV})} + t_d \cdot I_{avg} + A\right]}$$

Boost Mode $$I_p = I_{avg} + \sqrt{I_{avg}^2 + \frac{2V_{LV} \cdot (V_{HV} - V_{LV})}{L \cdot V_{HV}} \cdot \left[\frac{L \cdot I_1^2 + 2 \cdot L \cdot I_1 \cdot I_{avg}}{2 \cdot V_{LV}} + \frac{L \cdot I_{rev\_o}^2 + 2 \cdot L \cdot I_{rev\_o} \cdot I_{avg}}{2(V_{HV} - V_{LV})} + t_d \cdot I_{avg} + A\right]}$$

Thus, for a given value of the initial commutation current $I_{rev\_0} \geq I_{rev\_0\_min}$ and dead-time $t_d \geq t^*_d$, the analytically computed target switching period $T^*_S$ is given by:

Buck Mode $$T^*_s = t_1 + t_2 + t_3 + t_4 + t_d = \frac{L \cdot I_1}{V_{HV} - V_{LV}} + \frac{L \cdot I_p \cdot V_{HV}}{V_{LV} \cdot (V_{HV} - V_{LV})} + \frac{L \cdot I_{rev\_o}}{V_{LV}} + t^*_d$$

Figure 17:
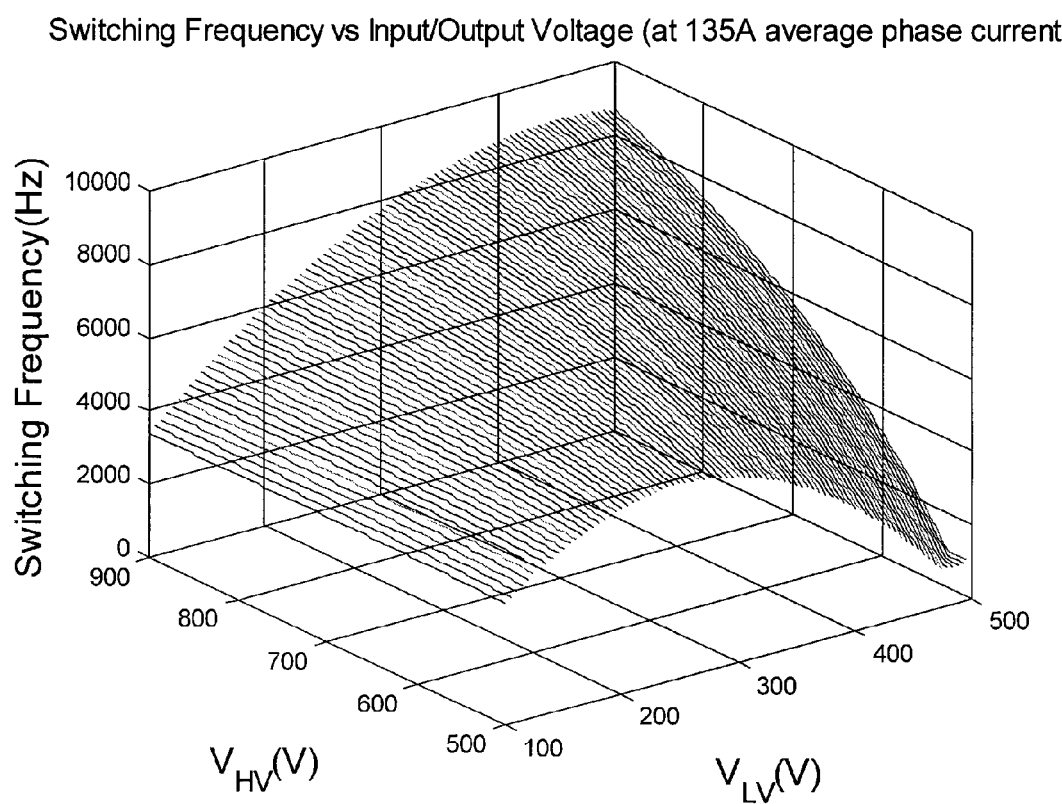
FIG. 17 is an example plot of switching frequency in buck mode as a function of the voltage across the high-voltage side and the voltage across the low-voltage side of the converter for a given value of the initial commutation current greater than the required minimum and a given value of the dead time greater than the required minimum, and at a fixed current demand, in accordance with a non-limiting embodiment of the present invention.
Figure 18:
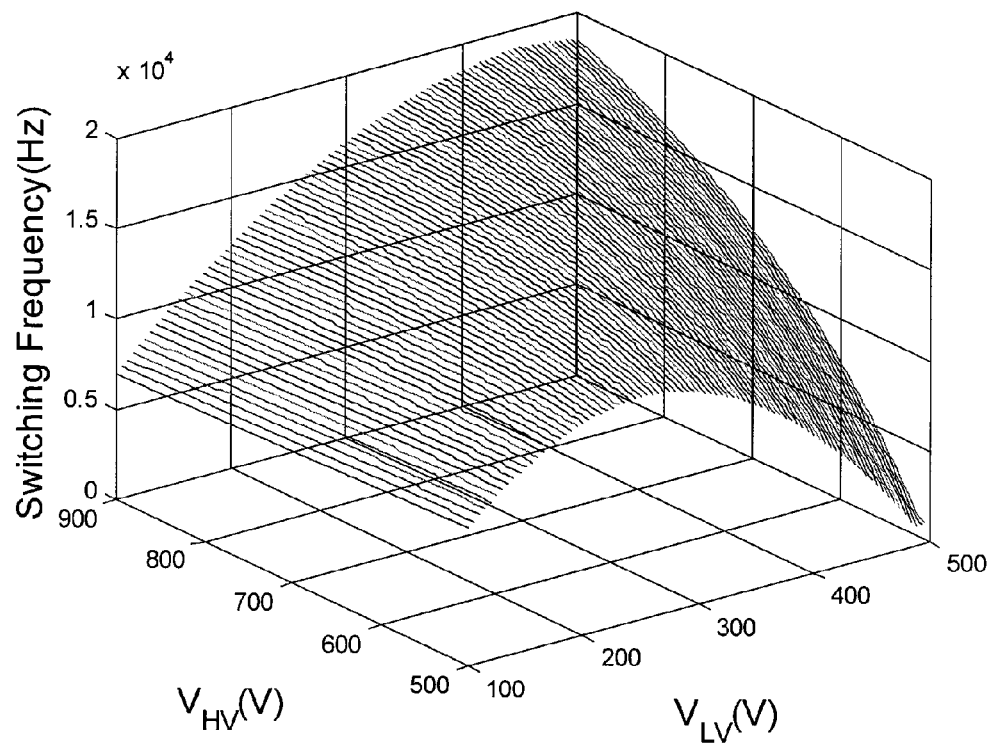
FIG. 18 is similar to FIG. 17, but for a different value of the fixed current demand.

FIGS. 17 and 18 show a plot of the target switching frequency $f_S$ (=$1/T_S$) in buck mode as a function of $V_{HV}$ and $V_{LV}$ for a given value of the initial commutation current $I_{rev\_0}$ obtained from FIG. 15 and a given value of the target dead time $t_d$ obtained from FIG. 16, and at a fixed current demand (for example, 135 A average phase current in FIGS. 17 and 50 A average phase current in FIG. 18). As can be observed, the higher the output current demand the lower the target switching frequency $f_S$. If the target switching frequency $f_S$ is too high, the target dead time $t_d$ and the initial commutation current $I_{rev\_0}$ will not be sufficient to achieve soft-switching. On the other hand, if the target switching frequency $f_S$ is too low, the converter 208 can still switch at zero-voltage, but transistor conduction losses and passive component current stress will be higher and power efficiency becomes lower.

Boost Mode $$T^*_s = t_1 + t_2 + t_3 + t_4 + t_d = \frac{L \cdot I_1}{V_{LV}} + \frac{L \cdot I_p \cdot V_{HV}}{V_{LV} \cdot (V_{HV} - V_{LV})} + \frac{L \cdot I_{rev\_o}}{V_{HV} - V_{LV}} + t^*_d$$

The dead time behavior in boost mode is similar to that in buck mode but its value diverges when a value of $I_{rev\_0}$ higher value than $I_{rev\_0\_min}$ is used.

Other Approaches

The above-described analytical approach provides one possible way to compute suitable values for the dead time and the switching frequency, given dynamically changing values of the sensed voltages $V_{HV}$, $V_{LV}$ and the output power demand, such that if the target dead time and the target switching frequency are set to those computed values, the switching controller will exhibit soft switching behavior. However, the above series of equations need not be solved in real time. For example, it is possible to pre-compute a set of suitable values for the dead time and the switching frequency using the above-described equations for a range of potential operating conditions (e.g., sensed voltages $V_{HV}$, $V_{LV}$, sensed average output current $I_{LV}$, impedance characteristics, $I_{REF}$ (as supplied by the voltage regulator 502), etc.), and to store these results in a memory 501 (e.g., in the form of a lookup table). If such an approach is adopted, the dead time and switching frequency determiner 500 takes on lookup table functionality. Specifically, the dead time and frequency determiner 50 can be configured for setting, as the target dead time and the target switching frequency, the pre-computed dead time and switching frequency values that correspond to the sensed voltages and the reference current.

In addition, it may not be necessary to solve the above series of equations at all, and yet still arrive at values for the target dead time and the target switching frequency that lead to soft switching behavior by the converter 208. For example, by empirically putting the converter 208 through multiple sets of operating conditions (leading to multiple combinations of sensed voltages $V_{HV}$, $V_{LV}$, sensed average output current $I_{LV}$, impedance characteristics, $I_{REF}$, etc.,), one can find which dead time and switching frequency lead to soft switching of the switching elements 312, 332. (It may turn out that the values obtained through experiment correspond to values that would have resulted from the aforementioned calculations, although this is not a requirement). Here again, the dead time and switching frequency determiner 500 may take on lookup table functionality, wherein the experimentally obtained values for the target dead time and the target switching frequency are stored in the memory 501 and retrieved during operation of the ESS 110.

Those skilled in the art will appreciate that there may be still other techniques for determining the target dead time and the target switching frequency that will lead to improved performance relative to a hard-switching converter under time-varying input voltage/current conditions. By "acceptable performance" is meant that the converter 208 can dynamically output desired power while maintaining the commutation current and dead-time required to ensure substantially zero-voltage and/or zero-current turn-on transition.

With the above in mind, acceptable performance may be achievable by selecting the target dead time and the target switching frequency from within a range of values. In one example, this range of values is within a certain percentage, such as 10-20%, of the analytically computed values.

In another example, the range of values is obtained from general observations relating to the behavior of the target dead time and target switching frequency as a function of the sensed voltages $V_{HV}$, $V_{LV}$ and/or the sensed average output current $I_{LV}$. For example, the target dead time can be modeled as a function of the sensed voltages $V_{HV}$, $V_{LV}$ shown in FIG. 16 (for a given value of the initial commutation current $I_{rev\_0}$). Also, the target switching $f_S$ can be modeled as a function of the sensed voltages $V_{HV}$, $V_{LV}$, shown in FIGS. 17 and 18 (for a given value of the target dead time $t_d$, the initial commutation current $I_{rev\_0}$ and the desired low-voltage-side average output current $I_{REF}$).

Duty Cycle

The following provides a more precise description of a non-limiting way in which a suitable value for the duty cycle can be determined.

From an analytical point of view, the aforementioned values for the dead time and the switching frequency were calculated for a given value of the average current demand $I_{avg}$. Conversely, in order to achieve this value of the average current demand $I_{avg}$, the corresponding duty cycle d (of the upper switch(es)) can be calculated in a straightforward fashion:

Buck Mode $$d = \frac{(t_1 + t_2)}{T_s^*} \qquad \text{(Eq-7)}$$

Boost Mode $$d = \frac{1 - (t_1 + t_2 + 2 \cdot t_d)}{T_s^*} \qquad \text{(Eq-8)}$$

However, from a practical point of view, a feedback controller is used to provide precise control of output current. Specifically, the target duty cycle is set by the current regulator 504 based on a comparison of a signal conveying the desired low-voltage-side average output current $I_{REF}$ (e.g., from the optional voltage regulator 502 or direct current command) and a signal conveying the sensed average output current $I_{LV}$ from the current sensor 354.

The current regulator 504 and the voltage regulator 502 will now be described in greater detail. It should be appreciated that it may be possible in some embodiments of the main controller 204 for the two regulators (i.e., the voltage regulator 502 and the current regulator 504) to be combined or for one of the two regulators (either the voltage regulator 502 or the current regulator 504) to be omitted.

Figure 6A:
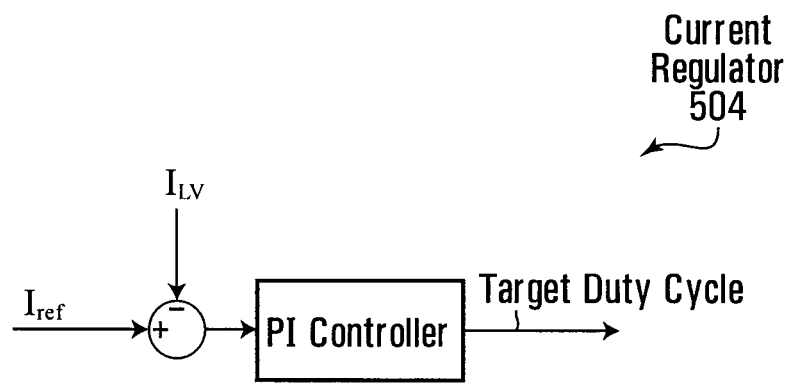
FIG. 6A is a block diagram of a current regulator forming part of the controller in FIG. 5, in accordance with a non-limiting embodiment of the present invention.

With reference to FIG. 6A, the current regulator 504 may comprise a PI (proportional integral) controller to provide feedback control of average load current by setting the target duty cycle. Of course, other types of controllers can be used, such as a PID (Proportional Integral Differential) controller.

Figure 6B:
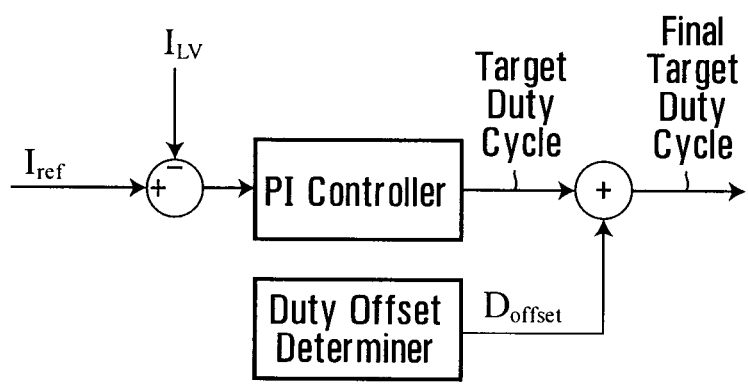
FIG. 6B is a variant of FIG. 6A, equipped with a duty offset determiner.

To further improve the control performance of current regulator 504, a feed-forward duty cycle offset can be added based on the soft-switching characteristics, as shown in FIG. 6B. This is because variable switching frequency control enables the initial commutation current to be close to $I_{rev\_0\_min}$ and thereby makes it possible to keep inductor current always close to the boundary of Discontinuous Conduction Mode (DCM) and Continuous Conduction Mode (CCM) over a wide power range. In this way, the duty cycle becomes estimatable (close to $V_{LV}/V_{HV}$), thereby the working load of PI regulators can be largely released through adding an approximate duty cycle offset of $V_{LV}/V_{HV}$. This duty offset can also be derived from an approximation of Eq-7 or Eq-8. By adding a duty offset, the converter 208 rapidly reaches a level close to the desired low-voltage-side average output current $I_{REF}$, and the PI feedback regulator most of time will just do the dynamic tuning and adjustment to achieve the desired current level.

Figure 7:
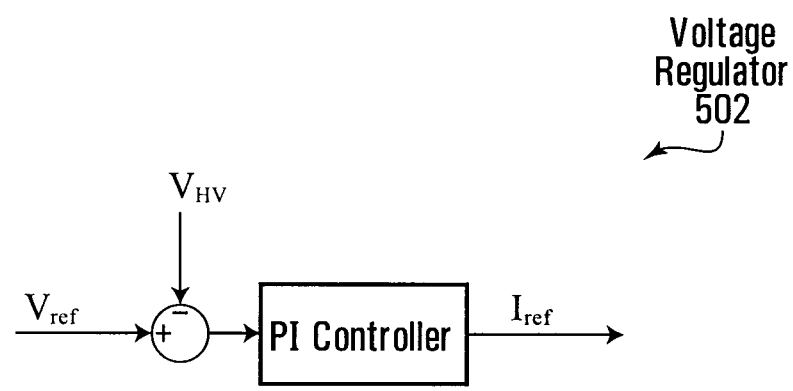
FIG. 7 is a block diagram of a voltage regulator forming part of the controller in FIG. 5, in accordance with a non-limiting embodiment of the present invention.

For applications where the high-voltage-side voltage is required to be controlled, the desired low-voltage-side average output current $I_{REF}$ is regulated according to the sensed voltage signal $V_{HV}$. When the sensed voltage $V_{HV}$ deviates from the reference voltage $V_{REF}$, then more current should be drawn from the low-voltage-side to the high-voltage-side. With reference to FIG. 7, the voltage regulator 502 may be implemented as a PI (proportional integral) controller to provide feedback control of the voltage across the high-voltage end 208H of the converter 208 through control of the desired low-voltage-side average output current $I_{REF}$. Of course, other types of controllers can be used, such as a PID (Proportional Integral Differential) controller or a look-up table determined by the application.

Figure 12:
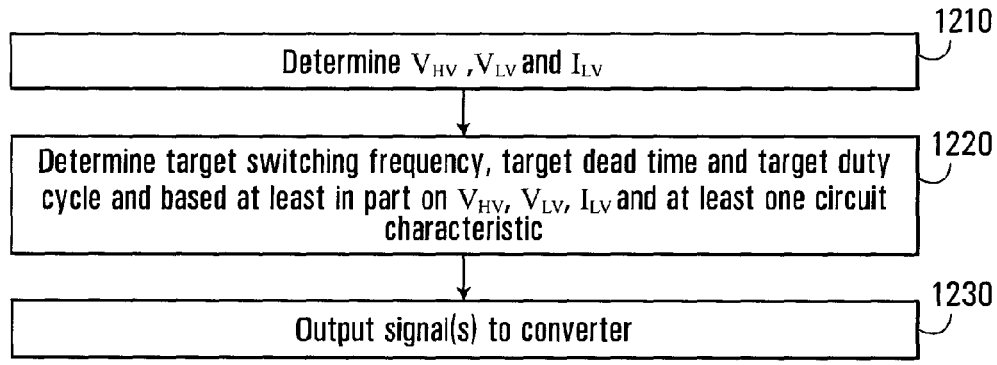
FIG. 12 is a flowchart illustrating a possible method executed by the control apparatus, in accordance with a non-limiting embodiment of the present invention.

In summary and with reference to FIG. 12, it will be appreciated that the above has shown various embodiments of a method for controlling the converter 208, which may include steps 1210, 1220, 1230. Step 1210 includes determining the voltage $V_{HV}$ across the high-voltage end 208H, the voltage $V_{LV}$ across the low-voltage end 208L and the sensed average output current $I_{LV}$ through the low-voltage end 208L. Step 1220 includes determining the target switching frequency (or equivalently, the target switching period), the target dead time and the target duty cycle for the converter 208 based at least in part on $V_{HV}$, $V_{LV}$ and $I_{LV}$ and at least one circuit characteristic of the converter, such as impedance, inductance and/or resistance values. Step 1230 includes outputting at least one output signal to cause the converter 208 to carry out soft switching in accordance with the target switching frequency (or equivalently, the target switching period), the target dead time and the target duty cycle.

In some embodiments, the at least one output signal referred to in step 1230 could be one or more target switching parameters supplied to the switching controller 206 and which convey(s) the target switching frequency (or equivalently, the target switching period), the target dead time and the target duty cycle. In other embodiments, the at least one control signal referred to in step 1230 could be the switching control signals (e.g., $S_U(t;\phi)$, $S_L(t;\phi)$) supplied directly to the converter 208.

Figure 13:
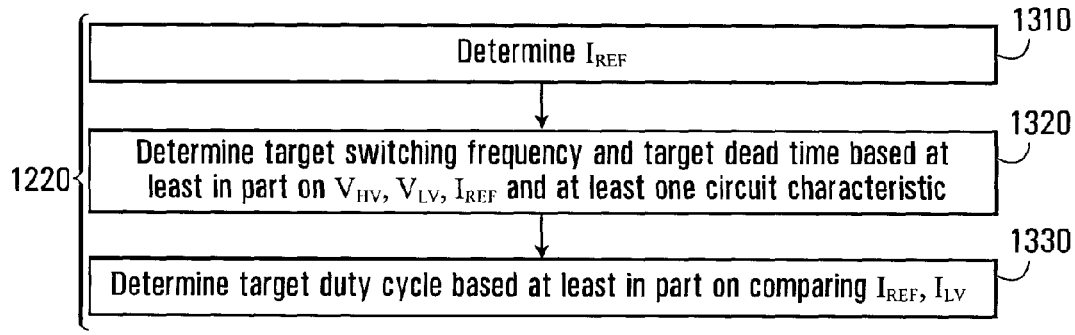
FIG. 13 is a flowchart illustrating further detail regarding one of the steps in the flowchart of FIG. 12, in accordance with a non-limiting embodiment of the present invention.

With reference now to FIG. 13, which expands upon step 1220 in FIG. 12, it will be appreciated that step 1220 can include steps 1310, 1320 and 1330. Specifically, step 1310 includes determining the desired low-voltage-side average output current $I_{REF}$. This can be done based on a comparison of the voltage $V_{HV}$ across the high-voltage end 208H to the reference voltage $V_{REF}$. In other applications that do not require voltage regulation, $I_{REF}$ can be directly provided.

Step 1320 includes determining the target switching frequency and the target dead time based at least in part on the voltage $V_{HV}$ across the high-voltage end 208H, the voltage $V_{LV}$ across the low-voltage end 208L, the desired low-voltage-side average output current $I_{REF}$ and at least one circuit characteristic (e.g., an impedance characteristic) of the converter 208.

Step 1330 includes determining the target duty cycle based at least in part on a comparison of the sensed current $I_{LV}$ through the low-voltage end 208L to the desired low-voltage-side average output current $I_{REF}$.

Figure 14:
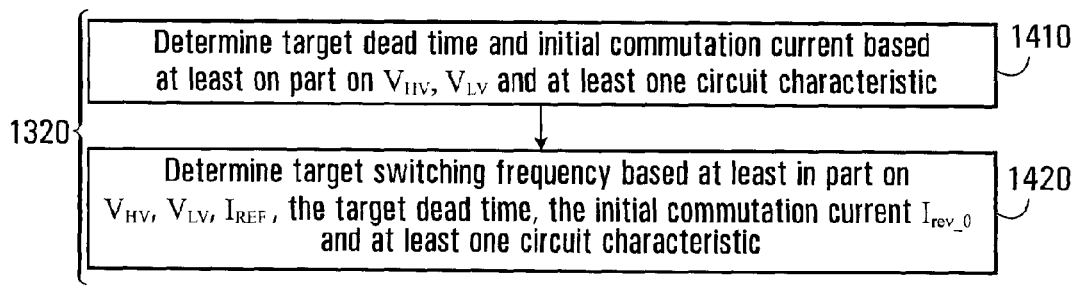
FIG. 14 is a flowchart illustrating further detail regarding one of the steps in the flowchart of FIG. 13, in accordance with a non-limiting embodiment of the present invention.

Reference is now made to FIG. 14, which expands upon step 1320 in FIG. 13. In particular, it will be appreciated that step 1320 can include steps 1410 and 1420. Step 1410 includes determining a target dead time and a suitable value for the initial commutation current $I_{rev\_0}$ based on the sensed voltages $V_{HV}$, $V_{LV}$ and the at least one circuit characteristic of the converter 208. Step 1420 includes determining a target switching frequency based on the sensed voltages $V_{HV}$, $V_{LV}$, the desired average output current $I_{REF}$, the target dead time, the initial commutation current and at least one circuit characteristic. It is noted that there is no limitation on the approach (e.g., analytical or otherwise) used to obtain the target switching frequency and the target dead time.

Those skilled in the art will appreciate that although the above description has focused on embodiments of the invention that provide bi-directional voltage conversion, other embodiments will find applicability to unidirectional voltage conversion, such as in the case of a buck converter or a boost converter. Also, embodiments of the present invention can be used across a wide range of applications where medium- to high-power converters are used, including railway, automotive, nautical, aircraft, spacecraft, mining, etc.

Those skilled in the art will appreciate that in some embodiments, all or part of the dead time and switching frequency determiner 500 may be implemented using one or more computing apparatuses/controller that have access to a code memory which stores computer-readable program code (instructions) for operation of the one or more computing apparatuses/controller. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses/controller via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the dead time and switching frequency determiner 500 may be implemented using pre-programmed hardware or firmware elements (e.g., application specific integrated circuits (ASICs), electrically erasable programmable read-only memories (EEPROMs), flash memory, etc.), or other related components.

In the examples described above, certain devices, elements and circuits are connected to each other as shown in the figures, for the sake of simplicity. In practical applications of the present invention, the devices, elements, circuits, etc. may be connected directly to each other or they may be connected indirectly to each other through other devices, elements, circuits, etc. Thus, in an actual configuration, the devices, elements and circuits are directly or indirectly coupled with or connected to each other.

Those skilled in the art will appreciate that certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without an element that is not specifically disclosed herein.

What is claimed is:

1. A control apparatus for use in controlling a power converter adapted to carry out power conversion between a high-voltage end and a low-voltage end of the power converter, the power converter comprising a first switching sub-circuit and a second switching sub-circuit connected to the first switching sub-circuit, the first switching sub-circuit including a first controllable switching element and the second switching sub-circuit including a second controllable switching element, the control apparatus comprising:
   an input configured for receiving at least one input signal conveying a sensed voltage across the high-voltage end, a sensed voltage across the low-voltage end and a sensed current through the low-voltage end;
   circuitry configured for determining a target switching frequency, a target dead time and a target duty cycle for the power converter at least in part by processing the sensed voltages, the sensed current and at least one circuit characteristic of the power converter; and
   a switching controller configured for processing the target switching frequency, the target dead time and the target duty cycle to generate at least one output control signal, said output control signal being configured to:
      cause the first controllable switching element to switch from an off state to an on state and back to the off state in accordance with the derived target switching frequency and the derived target duty cycle; and
      cause the second controllable switching element to switch from an off state to an on state and back to the off state while the first controllable switching element is in the off state, wherein after the second controllable switching element switches back to the off state, each of the first and second controllable switching elements remains in the off state for the derived target dead time before the first controllable switching element is switched back to the on state.

2. The control apparatus defined in claim 1, the circuitry being configured for determining the target switching frequency, the target dead time and the target duty cycle in response to changes in the at least one of the sensed voltages or the sensed current.

3. The control apparatus defined in claim 1, further comprising a plurality of sensors for capturing the sensed voltages and the sensed current.

4. The control apparatus defined in claim 1, wherein the circuitry comprises a current regulator configured for receiving an indication of a reference current and for determining the target duty cycle based on a difference between the desired reference current and the sensed current through the low-voltage end.

5. The control apparatus defined in claim 4, wherein the circuitry further comprises a dead time and switching frequency determiner configured for determining the target dead time and the target switching frequency based at least in part on at least one of the sensed voltages and the reference current.

6. The control apparatus defined in claim 5, wherein the dead time and switching frequency determiner is configured for computing the target dead time and an initial commutation current within the converter based at least in part on the sensed voltages and at least one circuit characteristic of the power converter.

7. The control apparatus defined in claim 6, wherein the converter is characterized by a resonant circuit and wherein the at least one circuit characteristic of the converter comprises a characteristic impedance of a resonant circuit.

8. The control apparatus defined in claim 5, further comprising a memory storing an association between sensed voltage and reference current values and corresponding dead time and switching frequency values, wherein the dead time and frequency determiner is configured for setting, as the target dead time and the target switching frequency, the dead time and switching frequency values retrieved from the memory as corresponding to the sensed voltages and the reference current.

9. The control apparatus defined in claim 6, wherein the dead time and switching frequency determiner is configured for computing the target switching frequency based on at least the sensed voltages, the reference current, the target dead time, the initial commutation current and the at least one circuit characteristic of the converter.

10. The control apparatus defined in claim 9, wherein the circuitry further comprises a voltage regulator for determining the reference current based on a reference voltage and at least one of the sensed voltages.

11. The control apparatus defined in claim 1, wherein the at least one output signal is indicative of time instants at which at least one of the first controllable switching element and the second controllable switching element is to be switched between on and off states.

12. The control apparatus defined in claim 1, wherein the power converter is a three-phase converter and wherein the at least one output control signal comprises three sets of at least one output control signal per set, one set for each respective phase of the power converter.

13. The control apparatus defined in claim 1, further comprising a duty cycle adjustment unit for adjusting the target duty cycle with an offset.

14. A method for controlling a power converter adapted to carry out power conversion between a high-voltage end and a low-voltage end of the power converter, the power converter comprising a first switching sub-circuit and a second switching sub-circuit connected to the first switching sub-circuit, the first switching sub-circuit including a first controllable switching element and the second switching sub-circuit including a second controllable switching element, the method comprising:

determining a voltage across the high-voltage end, a voltage across the low-voltage end and a current through the low-voltage end;

determining a target switching frequency, a target dead time and a target duty cycle for the converter at least in part by processing the voltage across the high-voltage end, the voltage across the low-voltage end, the current through the low-voltage end and at least one circuit characteristic of the converter;

processing the target switching frequency, the target dead time and the target duty cycle to generate at least one output control signal for controlling time instants at which the first controllable switching element and the second controllable switching element are to be switched between on and off states, wherein the output control signal generated being configured to cause the converter to carry out soft switching at least in part by:

causing the first controllable switching element to switch from an off state to an on state and back to the off state in accordance with the derived target switching frequency and the derived target duty cycle; and causing the second controllable switching element to switch from an off state to an on state and back to the off state while the first controllable switching element is in the off state, wherein after the second controllable switching element switches back to the off state, each of the first and second controllable switching elements remains in the off state for the derived target dead time before the first controllable switching element is switched back to the on state; and releasing the output control signal.

15. The method defined in claim 14, wherein determining a target switching frequency, a target dead time and a target duty cycle for the converter comprises:

determining the target switching frequency and the target dead time based at least in part on the voltage across the high-voltage end, the voltage across the low-voltage end, a desired average output current and the at least one circuit characteristic of the converter; and determining the target duty cycle based at least in part on the current through the low-voltage end and the desired average output current.

16. The method defined in claim 15, wherein determining the target switching frequency and the target dead time further comprises:

determining the desired average output current based at least in part on the voltage across the high-voltage end and a reference voltage.

17. The method defined in claim 15, wherein the first switching sub-circuit of the power converter has a first terminal and a second terminal, the first terminal of the first switching sub-circuit connected to a first terminal of the high-voltage end of the power converter, the first switching element of the first switching sub-circuit having a first freewheeling diode, a first snubber capacitor and a first control input for controlling switching of the first switching element;

the second switching sub-circuit of power converter has a first terminal and a second terminal, the first terminal of the second switching sub-circuit connected to the second terminal of the first switching sub-circuit, the second terminal of the second switching sub-circuit connected to a second terminal of the high-voltage end, the second switching element of the second switching sub-circuit having a second freewheeling diode, a second snubber capacitor and a second control input for controlling switching of the second switching element;

the power converter further comprising an inductor with a first terminal and a second terminal, the first terminal of the inductor connected to the second terminal of the first switching sub-circuit and to the first terminal of the second switching sub-circuit, the second terminal of the inductor connected to a first terminal of the low-voltage end;

wherein a second terminal of the low-voltage end is connected to the second terminal of the second switching sub-circuit and to the second terminal of the high-voltage end;

wherein the first switching element is switchable from an off state to an on state and back to the off state in accordance with a switching frequency and a duty cycle, whereby upon the first switching element switching to the off state, current flowing through the inductor in a direction of average current begins to decrease;

wherein the second switching element is switchable from an off state to an on state and back to the off state while the first switching element remains in the off state;

wherein a dead time interval corresponds to the time interval between switching of the second switching element to the off state and switching of the first switching element back to the on state.

18. The method defined in claim 17, wherein the soft switching produces a commutation current corresponding to the current through the inductor in a direction opposite to the direction of average current flow, the commutation current having an initial value at the beginning of the dead time interval; and wherein determining the target switching frequency and the target dead time comprises:

determining the target dead time and a desired initial value for the commutation current based at least in part on the voltage across the high-voltage end, the voltage across the low-voltage end and the at least one circuit characteristic of the converter; and determining the target switching frequency based at least in part on the voltage across the high-voltage end, the voltage across the low-voltage end, the target dead time, the desired average output current, the desired initial value for the commutation current and the at least one circuit characteristic of the converter.

19. A non-transitory computer-readable storage medium storing computer-readable instructions which, when executed by a controller, cause the controller to execute a method of controlling a power converter adapted to carry out power conversion between a high-voltage end and a low-voltage end of the power converter, the power converter comprising a first switching sub-circuit and a second switching sub-circuit connected to the first switching sub-circuit, the first switching sub-circuit including a first controllable switching element and the second switching sub-circuit including a second controllable switching element, the method comprising:

determining a voltage across the high-voltage end, a voltage across the low-voltage end and a current through the low-voltage end;

determining a target switching frequency, a target dead time and a target duty cycle for the converter at least in part by processing the voltage across the high-voltage end, the voltage across the low-voltage end, the current through the low-voltage end and at least one circuit characteristic of the converter;

processing the target switching frequency, the target dead time and the target duty cycle to generate at least one output control signal for controlling time instants at which the first controllable switching element and the second controllable switching element are to be switched between on and off states, wherein the output control signal generated being configured to cause the converter to carry out soft switching at least in part by:
  causing the first controllable switching element to switch from an off state to an on state and back to the off state in accordance with the derived target switching frequency and the derived target duty cycle; and
  causing the second controllable switching element to switch from an off state to an on state and back to the off state while the first controllable switching element is in the off state, wherein after the second controllable switching element switches back to the off state, each of the first and second controllable switching elements remains in the off state for the derived target dead time before the first controllable switching element is switched back to the on state; and
releasing the output control signal.

* * * * *